(12) United States Patent
Kobayashi

(10) Patent No.: US 7,924,047 B2
(45) Date of Patent: *Apr. 12, 2011

(54) SEMICONDUCTOR APPARATUS

(75) Inventor: Shotaro Kobayashi, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/073,755

(22) Filed: Mar. 10, 2008

(65) Prior Publication Data

US 2008/0258756 A1    Oct. 23, 2008

Related U.S. Application Data

(63) Continuation of application No. 11/365,885, filed on Mar. 2, 2006, now Pat. No. 7,391,230.

(30) Foreign Application Priority Data

Mar. 3, 2005 (JP) .................. 2005-059220

(51) Int. Cl.
*H03K 17/16* (2006.01)
*H03K 19/003* (2006.01)

(52) U.S. Cl. ................. 326/30; 326/34; 326/87

(58) Field of Classification Search .............. None
See application file for complete search history.

(56) References Cited

U.S. PATENT DOCUMENTS

| | | | |
|---|---|---|---|
| 6,021,071 A | 2/2000 | Otsuka | |
| 6,556,083 B2 | 4/2003 | Kim et al. | |
| 6,605,958 B2 | 8/2003 | Bergman et al. | |
| 6,628,223 B2 | 9/2003 | Nagano | |
| 6,809,546 B2 | 10/2004 | Song et al. | |
| 6,927,600 B2 | 8/2005 | Choe | |
| 7,102,200 B2 * | 9/2006 | Fan et al. | ........... 257/379 |
| 7,205,787 B1 | 4/2007 | Massoumi et al. | |
| 2005/0117433 A1 * | 6/2005 | Fujisawa | ........... 365/226 |

FOREIGN PATENT DOCUMENTS

| | | |
|---|---|---|
| JP | 10-224201 | 8/1998 |
| JP | 11-055104 | 2/1999 |
| JP | 11-185479 | 7/1999 |
| JP | 2000-151721 A | 5/2000 |
| JP | 2002-033774 A | 1/2002 |
| JP | 2002-152032 A | 5/2002 |
| JP | 2002-199030 A | 7/2002 |
| JP | 2002-330182 A | 11/2002 |
| JP | 2003-143002 A | 5/2003 |
| JP | 2003-347923 A | 12/2003 |
| JP | 2004-032070 A | 1/2004 |
| JP | 2004-096759 A | 3/2004 |

* cited by examiner

*Primary Examiner* — Anh Q Tran
(74) *Attorney, Agent, or Firm* — Foley & Lardner LLP

(57) ABSTRACT

The on-die termination circuit of the present invention includes a main resistance circuit and an adjustment circuit. The main resistance circuit is provided with a resistance element and a transistor that is turned OFF when the on-die termination circuit is to be placed in the OFF state and turned ON when the on-die termination circuit is to be placed in the ON state. The adjustment circuit is provided with transistors that are both connected together in parallel and connected in parallel to the main resistance circuit, and that are turned ON or OFF when the on-die termination circuit is placed in the ON state so as to adjust the termination resistance of the entire on-die termination circuit.

17 Claims, 21 Drawing Sheets

SEMICONDUCTOR APPARATUS

CROSS-REFERENCE TO RELATED PATENT APPLICATIONS

This application is a continuation of application Ser. No. 11/365,885, filed Mar. 2, 2006, now pending, and based on Japanese Patent Application No. 2005-059220, filed Mar. 3, 2005, by Shotaro Kobayashi, the disclosures of which are incorporated herein by reference in their entirety. This application claims only subject matter disclosed in the parent application and therefore presents no new matter.

BACKGROUND OF THE INVENTION

1. Field of the Invention

The present invention relates to an on-die termination circuit mounted as a termination circuit in LSI (Large Scale Integration).

2. Description of the Related Art

In recent years, the demand for LSI having higher speeds, greater bandwidth operation, and lower power consumption continues to grow, and the transfer bus inside an LSI must therefore be treated as a high-speed transmission path. The demand for miniaturization of LSI is also growing, and with this demand comes a growing need for mounting on-die termination circuits as termination circuits for terminating the transfer bus to absorb reflection of bus signals transmitted in the transfer bus in the LSI. Recently, devices in which on-die termination circuits are mounted such as DDR2 SDRAM (Double Data Rate 2-Synchronous Dynamic Random Access Memory) are being manufactured.

In an on-die termination circuit, the termination resistance, which is the impedance of the entire on-die termination circuit with respect to a terminal connected to the transfer bus, in some cases diverges from the target value due to variations that occur during manufacturing. Thus, from the standpoints of maintaining characteristics and ensuring yield, the on-die termination circuit must therefore be provided with the capability for adjustment of the termination resistance, and from the standpoint of reducing power consumption, must further be provided with the capability to turn off the on-die termination circuit when the operation is halted.

FIG. 1 shows the configuration of an on-die termination circuit according to the first example of the prior art. This configuration can be readily deduced from the technology disclosed in JP-A-2002-152032.

As shown in FIG. 1, the on-die termination circuit of the first example of the prior art is composed of only transistors p1~p5, which are PMOS transistors, and is of a configuration in which transistors p1~p5 are connected together in parallel.

Control signals 1~5 are applied as input to the gate terminals of transistors p1~p5, respectively, and control signals 1~5 control the ON/OFF states of transistors p1~p5. The terminal pin is the terminal that connects the on-die termination circuit to the transfer bus. Vswing represents the difference in potential across the two ends of the on-die termination circuit, i.e., the voltage of the termination pin and the termination voltage (assumed to be the power supply voltage VDD in FIG. 1).

However, because the on-die termination circuit of the first example of the prior art shown in FIG. 1 is composed solely of transistors p1~p5 which are PMOS transistors, the circuit suffers from the problem that the impedance varies widely according to the voltage level of Vswing due to the characteristics of MOS transistors.

FIG. 2 shows the typical IDS-VDS characteristic of a MOS transistor.

As shown in FIG. 2, when a MOS transistor is used as a resistance element, the resistance can be considered as linear resistance similar to the resistance in normal wiring in the linear region, and particularly in the linear region in which VDS is low. However, in the linear region in which VDS increases and approaches the saturation region, the change in resistance becomes nonlinear and can no longer be treated as normal linear resistance.

Vswing shown in FIG. 1 varies according to various standards, but is equal to the power supply voltage in SDRAM, DDR-SDRAM, and DDR2-SDRAM, and Vswing therefore can attain a high value. Vswing attains a high value because, according to the standards in SDRAM, a voltage is delivered ranging from GND to the power supply voltage and the termination voltage is made the same voltage as the power supply voltage of the SDRAM. When the on-die termination circuit according to the first example of the prior art is mounted in an SDRAM, VDS exceeds "VGS-Vth" and transistors p1~p5 therefore operate in the saturation region, whereby the termination resistance can no longer be maintained at a fixed value. Consequently, the reflection of the bus signals transferred through the transfer bus has an adverse effect on signal transmission.

In RDRAM (Rambus DRAM), in which the amplitude is smaller than for SDRAM, Vswing is in the order of 1V. When the on-die termination circuit according to the first example of the prior art is mounted in RDRAM and if the threshold voltage Vth of transistors p1~p5 is set to the order of 0.7V, transistors p1~p5 operate in the linear region until the power supply voltage reaches the level of 2.5V. If operation at low voltage is desired for the sake of reducing power consumption, however, transistors p1~p5 will operate in the saturation region as described above when the power supply voltage reaches the level of 1.8V, and the termination resistance can no longer be maintained at a fixed level.

However, from the standpoint of lowering power consumption, the capability to place the on-die termination circuit in the OFF state is required in an on-die termination circuit as described hereinabove, and a configuration that employs transistors as switch elements is therefore necessary.

Accordingly, a configuration cannot be adopted in which termination resistance that depends only on resistor element r1 is adjusted by transistor p1, as in the configuration of the second example of the prior art shown in FIG. 3. This configuration is similar to the configuration disclosed in JP-A-1999-55104.

The following explanation regards an on-die termination circuit that provides a solution to the above-described drawback, i.e., that can reduce the fluctuation in the termination resistance in accordance with Vswing voltage level, and moreover, that can set the on-die termination circuit to the OFF state.

FIGS. 4A and 5A show the configuration of the on-die termination circuit of the third example of the prior art. In FIGS. 4A and 5A, the composition of the circuits are identical, but the transistors that turn ON during adjustment of termination resistance differ. In addition, FIG. 4B shows an equivalent circuit diagram in which FIG. 4A is represented by resistor elements and capacitance elements, and FIG. 5B shows an equivalent circuit diagram in which FIG. 5A is represented by resistor elements and capacitance elements.

As shown in FIGS. 4A and 5A, the on-die termination circuit of the third example of the prior art is of a configuration in which five sets of unit circuits, in which resistor elements and transistors are connected in a series, are connected together in parallel.

Control signals are applied as input to the gate terminals of transistors p1~p5, which are PMOS transistors, and transistors p1~p5 are thus switched ON and OFF by these control signals. However, in order to clarify whether transistors p1~p5 are ON or OFF, the following figures show GND connected to the gate terminals of transistors p1~p5 when the transistors are ON and the power supply connected when the transistors are OFF. Further, of the voltage difference Vswing between the two ends, VswingR indicates the voltage difference that depends on resistor elements, and Vswing p indicates the voltage difference that depends on transistors.

In all unit circuits rsum1~rsum5, the resistance ratios of the resistor elements and transistors are substantially equal. Here, the ratio of the resistance of a resistor element to the resistance of a transistor is 4:1. Accordingly, because the resistance of a transistor is ⅕ of the total, fluctuation in the termination resistance that originates from fluctuation in Vswing can be reduced.

In addition, unit circuits rsum1~rsum5 are of a binary configuration in which impedance values Rsum1~Rsum5 of each of unit circuits rsum1~rsum5 have the following relation:

$$R\text{sum}1 = R\text{sum}2/2 = R\text{sum}3/4 = R\text{sum}4/8 = R\text{sum}5/16$$

If PW is the width w of transistor p1, then the widths w of transistors p2, p3, p4 and p5 are PW/2, PW/4, PW/8, and PW/16, respectively. If R1 is the resistance of resistor element r1, resistances R2, R3, R4, and R5 of resistor elements r2, r3, r4, and r5 are 2×R1, 4×R1, 8×R1, and 16×R1, respectively. If Rp1 is resistance of resistance component rp1 of transistor p1, then resistances Rp2, Rp3, Rp4, and Rp5 of resistance components rp2, rp3, rp4, and rp5 of transistors p2, p3, p4 and p5 are 2×Rp1, 4×Rp1, 8×Rp1, and 16×Rp1, respectively. Further, if Cp1 is the capacitance of capacitance component cp1 of transistor p1, then capacitances Cp2, Cp3, Cp4, and Cp5 of capacitance components cp2, cp3, cp4, and cp5 of transistors p2, p3, p4, and p5 are Cp1/2, Cp1/4, Cp1/8, and Cp1/16, respectively.

FIG. 4A shows the state in which two transistors p1 and p2 are ON and the termination resistance of the entire on-die termination circuit with respect to the terminal pin is adjusted to 50Ω. In this case, R1 is assumed to be 60Ω (Rp1=R1/4=15Ω, and Rsum1=R1+Rp1=75Ω). In contrast, FIG. 5A shows the state in which, because the termination resistance has been fabricated at a low level, the two transistors p1 and p3 are turned ON to adjust the termination resistance to 50Ω. In this case, R1 is assumed to be in the order of 50Ω.

In the case of FIG. 4A, considering the frequency characteristic, impedances Rsum1~Rsum5 of unit circuits rsum1~rsum5 can be represented as shown below. Both here and in subsequent equations, s=jω.

$$R\text{sum}1 = R1 + (Rp1 \,//\, 1/(sCp1on))$$

$$R\text{sum}2 = R2 + (Rp2 \,//\, 1/(sCp2on))$$

$$= 2 \times R1 + (2 \times Rp1 \,//\, 1/(sCp1on/2))$$

$$R\text{sum}3 = R3 + 1/(sCp3off) = 4 \times R1 + 1/(sCp1off/4)$$

$$R\text{sum}4 = R4 + 1/(sCp4off) = 8 \times R1 + 1/(sCp1off/8)$$

$$R\text{sum}5 = R5 + 1/(sCp5off) = 16 \times R1 + 1/(sCp1off/16)$$

Similarly, in the case of FIG. 5A, the impedances Rsum1~Rsum5 of unit circuits rsum1~rsum5 that take the frequency characteristic into consideration can be represented as follows:

$$R\text{sum}1 = R1 + (Rp1 \,//\, 1/sCp1on)$$

$$R\text{sum}2 = R2 + 1/(sCp2off) = 2 \times R1 + 1/(sCp1off/2)$$

$$R\text{sum}3 = R3 + (Rp3 \,//\, 1/(sCp3on))$$

$$= 4 \times R1 + (4 \times Rp1 \,//\, 1/(sCp1on/4))$$

$$R\text{sum}4 = R4 + 1/(sCp4off) = 8 \times R1 + 1/(sCp1off/8)$$

$$R\text{sum}5 = R5 + 1/(sCp5off) = 16 \times R1 + 1/(sCp1off/16)$$

In addition, the impedance RTerm of the entire on-die termination circuit with respect to the terminal pin can be represented as follows:

$$R\text{Term} = R\text{sum}1 // R\text{sum}2 // R\text{sum}3 // R\text{sum}4 // R\text{sum}5$$

FIG. 6 shows the result of plotting RTerm against frequency for the two cases of FIG. 4A and FIG. 5A.

As shown in FIG. 6, R_lower, which is the minimum value of RTerm, is the point at which impedance stabilizes in the high-frequency region. R_lower shown in FIG. 6 shows the value of R_lower for the case of FIG. 4A. This R_lower can only be approximated by resistances R1~R5 of resistance elements r1~r5 in the equation above, and in the cases of both FIG. 4A and FIG. 5A, converges on the resistance of RTerm when only resistor elements r1~r5 are connected together in parallel.

In other words, impedance RTerm of the high-frequency region for the case of FIG. 4A can be represented as follows:

$$R\text{Term} = R1 \,//\, R2 \,//\, R3 \,//\, R4 \,//\, R5$$

$$= 60 \,//\, 120 \,//\, 240 \,//\, 480 \,//\, 960$$

$$\approx 30\Omega$$

Impedance RTerm of the high-frequency region for the case of FIG. 5A can be similarly represented as follows:

$$R\text{Term} = R1 \,//\, R2//R3 \,//\, R4 \,//\, R5$$

$$= 50 \,//\, 100 \,//\, 200 \,//\, 400 \,//\, 900$$

$$\approx 25.8\Omega$$

The frequency dependence of the termination resistance is therefore great in the third example of the prior art, and in either of the cases of FIG. 4A and FIG. 5A, impedance RTerm at which stability is attained in the high-frequency region is considerably lower than the target of 50Ω.

In addition, for the case of FIG. 4A and the case of FIG. 5A, the transistors that are switched ON during the adjustment of the termination resistance differ and the parasitic element configuration of these parts therefore also differs, and as a result, the frequency characteristic changes and the impedance RTerm at which stability is attained differs greatly. Considering the resistance of resistor element r2 and the size (width) of transistor p2, unit circuit rsum2 that is ON in FIG. 5A when compared with unit circuit rsum3 that is ON in FIG. 4A can be considered to have an additional resistor element having high resistance and capacitance element having high capacitance. As a result, the impedance RTerm in FIG. 5A is lower in the low-frequency region than in FIG. 4A.

FIG. 7A and FIG. 8A show the configuration of an on-die termination circuit according to a fourth example of the prior art. Although the circuit configurations are identical in FIG. 7A and FIG. 8A, the transistors that are ON during adjustment of the termination resistance differ. In addition, FIG. 7B shows an equivalent circuit diagram in which FIG. 7A is represented by resistance elements and capacitance elements, and FIG. 8B shows an equivalent circuit diagram in which FIG. 8A is represented by resistance elements and capacitance elements.

As shown in FIG. 7A and FIG. 8A, the on-die termination circuit of the fourth example of the prior art is a configuration composed of resistance element r0 and transistors p1~p5, which are PMOS transistors that are both connected together in parallel and connected in a series to resistor element r0.

Unit circuits rsum1~rsum5 are composed of transistors p1~p5, respectively, and are of a binary configuration in which the impedances Rsum1~Rsum5 of each of these unit circuits are in the following relation:

$$Rsum1=Rsum2/2=Rsum3/4=Rsum4/8=Rsum5/16$$

The relationships between the width w of transistors p1~p5 and resistances Rp1~Rp5 of resistance components rp1~rp5 and capacitances Cp1~Cp5 of capacitance components cp1~cp5 of transistors p1~p5 are identical to the third example of the prior art.

FIG. 7A shows the state in which the two transistors p1 and p2 are ON and the termination resistance of the entire on-die termination circuit with respect to the terminal pin is adjusted to 50Ω. In this case, R0 is assumed to be 25Ω and Rp1 is assumed to be approximately 37.5Ω. In contrast, FIG. 8A shows a case in which, because the termination resistance is fabricated somewhat low, the two transistors p1 and p3 are ON and the termination resistance is adjusted to 50Ω. In this case, R0 is assumed to be approximately 20Ω.

In the case of FIG. 7A, impedances Rsum1~Rsum5 of unit circuits rsum1~rsum5, for a case that takes the frequency characteristic into consideration, can be represented as follows:

$$Rsum1 = Rp1 \mathbin{/\mkern-5mu/} 1/sCp1on$$

$$Rsum2 = R2 + (Rp2 \mathbin{/\mkern-5mu/} 1/(sCp2on))$$

$$= 2 \times R1 + (2 \times Rp1 \mathbin{/\mkern-5mu/} 1/(sCp1on/2))$$

$$Rsum3 = R3 + 1/(sCp3off) = 4 \times R1 + 1/(sCp1off/4)$$

$$Rsum4 = R4 + 1/(sCp4off) = 8 \times R1 + 1/(sCp1off/8)$$

$$Rsum5 = R5 + 1/(sCp5Off) = 16 \times R1 + 1/(sCp1off/16)$$

Similarly, in the case of FIG. 8A, impedances Rsum1~Rsum5 of unit circuits rsum1~rsum5, for a case that takes the frequency characteristic into consideration, can be represented as follows:

$$Rsum1 = Rp1 \mathbin{/\mkern-5mu/} 1/sCp1on$$

$$Rsum2 = R2 + 1/(sCp2off) = 2 \times R1 + 1/(sCp1off/2)$$

$$Rsum3 = R3 + (Rp3 \mathbin{/\mkern-5mu/} 1/(sCp3on))$$

$$= 4 \times R1 + (4 \times Rp1 \mathbin{/\mkern-5mu/} 1/(sCp1on/4))$$

-continued $$Rsum4 = R4 + 1/(sCp4off) = 8 \times R1 + 1/(sCp1off/8)$$

$$Rsum5 = R5 + 1/(sCp5off) = 16 \times R1 + 1/(sCp1off/16)$$

In addition, the impedance RTerm of the entire on-die termination circuit with respect to the terminal pin can be represented as follows:

$$RTerm=R0+(Rsum1 \mathbin{/\mkern-5mu/} Rsum2 \mathbin{/\mkern-5mu/} Rsum3 \mathbin{/\mkern-5mu/} Rsum4 \mathbin{/\mkern-5mu/} Rsum5)$$

FIG. 9 shows the results of plotting RTerm against frequency in each of the cases of FIG. 7A and FIG. 8A.

As shown in FIG. 9, R_lower, which is the minimum value of RTerm, is the impedance stabilization point in the high-frequency region, as in the third example of the prior art. This R_lower converges on resistance R0 of main resistor element r0 in the case of both FIG. 7A and FIG. 8A.

In other words, impedance RTerm of the high-frequency region is 25Ω in the case of FIG. 7A and 20Ω in the case of FIG. 8A.

The frequency dependence of the termination resistance is therefore great in the fourth example of the prior art, and impedance RTerm at which stability is attained in the high-frequency region is considerably lower than the target of 50Ω in either of the cases of FIG. 7A and FIG. 8A. The divergence between the termination resistance in the case of FIG. 8A (R0=20Ω) and the termination resistance in the case of FIG. 7A (R0=25Ω) is as great as 25%, but even if the divergence is reduced to the order of 10% (R0=22Ω), impedance RTerm at which stability is attained is still approximately 22Ω and is thus considerably lower than the target of 50Ω.

Because the transistors that are ON during adjustment of the termination resistance differ in the case of FIG. 7A and the case of FIG. 8A and the parasitic element configuration of these portions consequently differ, the frequency characteristics change and impedance RTerm at which stability is attained varies greatly. In the fourth example of the prior art, however, resistances Rp1~Rp5 of transistors p1~p5 must be set higher than in the third example of the prior art (Rp1=37.5Ω in the case of FIG. 7A), whereby the size (width) of transistors p1~p5 is smaller, and change in the frequency characteristics is also smaller.

As previously explained, the termination resistance is highly dependent on frequency when adjusting the termination resistance in an on-die termination circuit of the prior art, and the prior art therefore suffers from the problem that the termination resistance is lower than the target value in the high-frequency region.

A difference in the transistors that are ON when adjusting the termination resistance raises the problem that the parasitic element configuration of these parts also differs, whereby the frequency characteristic changes and the termination resistance at which stability is attained in the high-frequency region varies greatly.

SUMMARY OF THE INVENTION

It is an object of the present invention to provide an on-die termination circuit that, during adjustment of termination resistance, can keep the termination resistance close to the target value even within the high-frequency region, and moreover, that can suppress the fluctuation of termination resistance that results from differences in the configuration of parasitic elements.

The on-die termination circuit of the present invention includes a main resistance circuit and an adjustment circuit.

The main resistance circuit is provided with one or more resistance elements and one or more transistors that are turned OFF when the on-die termination circuit is to be placed in the OFF state and that turn ON when the on-die termination circuit is to be placed in the ON state.

The adjustment circuit is provided with one or more transistors that are both connected together in parallel and connected in parallel to the main resistance circuit, these transistors being turned ON or OFF when the on-die termination circuit is placed in the ON state so as to adjust the termination resistance of the entirety of the on-die termination circuit.

According to this configuration, the amount of fluctuation of the resistance of the resistance elements of the main resistance circuit during adjustment of the termination resistance is adjusted by turning the transistors of the adjustment circuit ON and OFF. In other words, the transistors of the adjustment circuit are components provided for adjusting the amount of fluctuation of the resistance of resistance elements, and because the transistors of the adjustment circuit are connected in parallel with the main resistance circuit, are able to set the resistance to a higher level.

Because the resistance of the transistors of the adjustment circuit can thus be set to a high value, of the transistors of the adjustment circuit in the circuit configuration, the impedance of transistors that have been switched OFF when adjusting the termination resistance attain a sufficiently high value and can be ignored.

As a result, the frequency dependency of the on-die termination circuit overall can be reduced, and the fluctuation of the termination resistance depending on frequency can be suppressed. The termination resistance can therefore be maintained at a value relatively close to the target value even in the high-frequency region.

In addition, the impedance of transistors that are OFF can be ignored despite variations in transistors that are ON when adjusting the termination resistance and the consequent changes in the parasitic element configuration of these parts. The termination resistance of the entire on-die termination circuit can therefore be kept substantially uniform, whereby fluctuations in the termination resistance that result from variation in the configuration of parasitic elements can also be suppressed even in the high-frequency region.

Finally, the resistance of transistors that make up the adjustment circuit is preferably at least 2.5 times the target value of the termination resistance. In addition, the transistors that make up the main resistance circuit and the adjustment circuit are preferably NMOS transistors, PMOS transistors, or CMOS transistors with which NMOS transistors and PMOS transistors are associated.

The above and other objects, features, and advantages of the present invention will become apparent from the following description with reference to the accompanying drawings which illustrate examples of the present invention.

DETAILED DESCRIPTION OF THE PREFERRED EMBODIMENTS

First Embodiment

Figure 1:
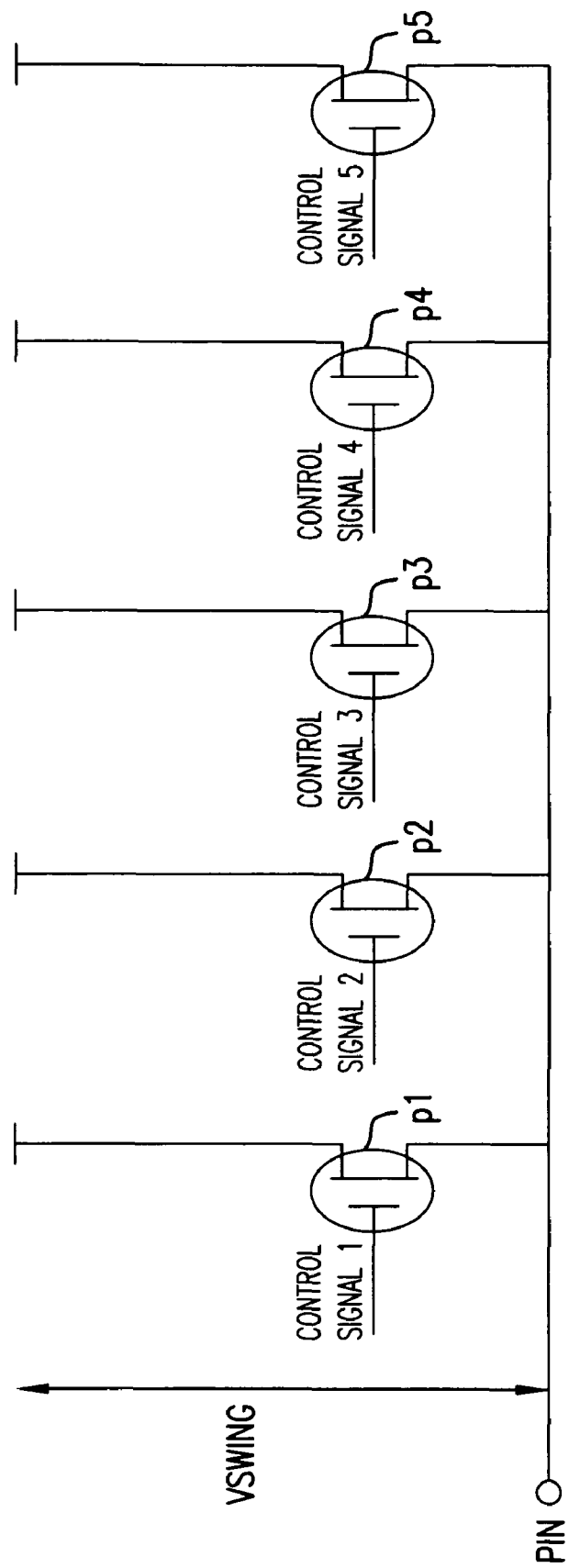
FIG. 1 is a circuit diagram showing the configuration of an on-die termination circuit of the first example of the prior art.
Figure 2:
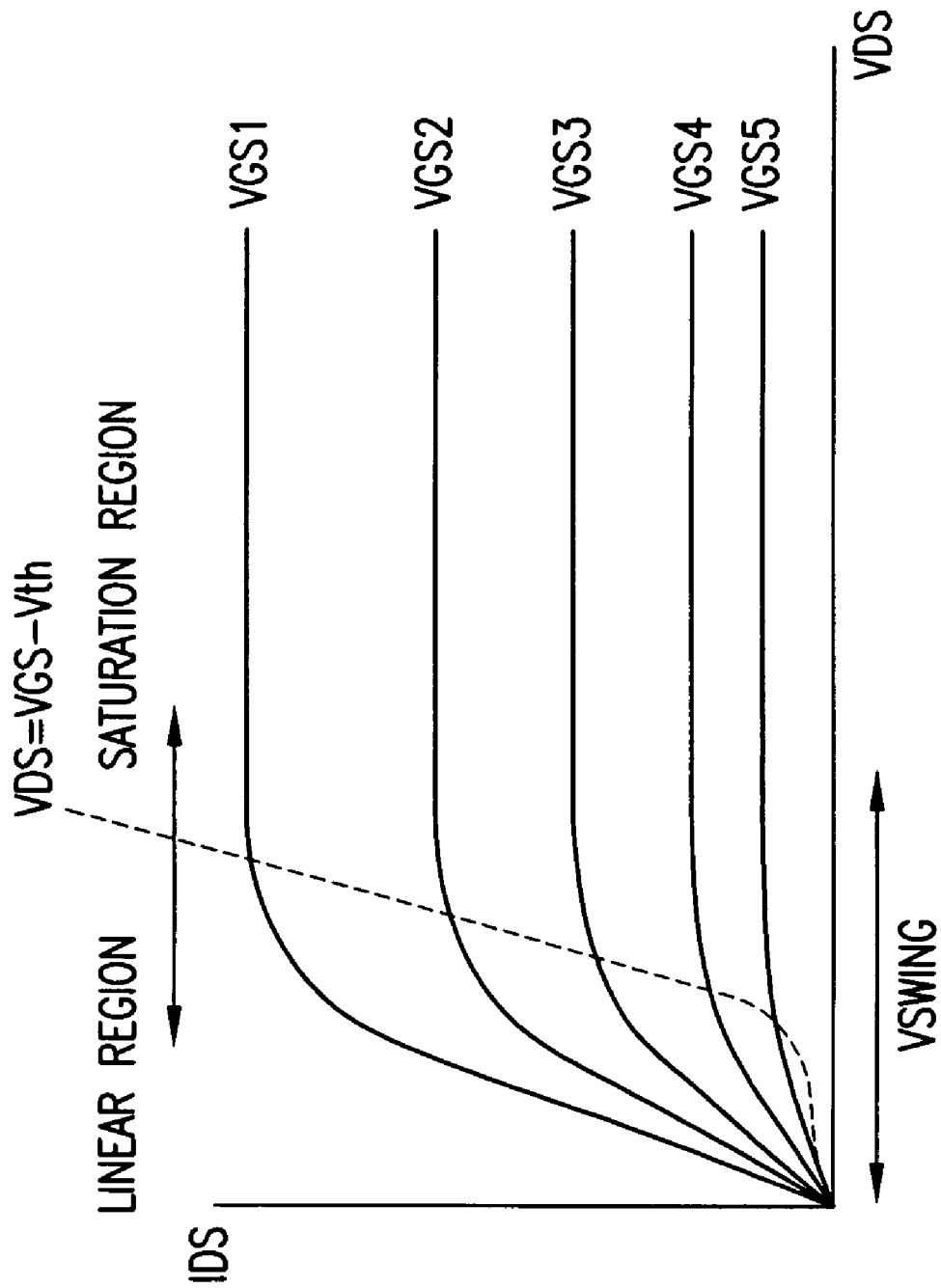
FIG. 2 is a graph showing the typical IDS-VDS characteristic of a MOS transistor.
Figure 3:
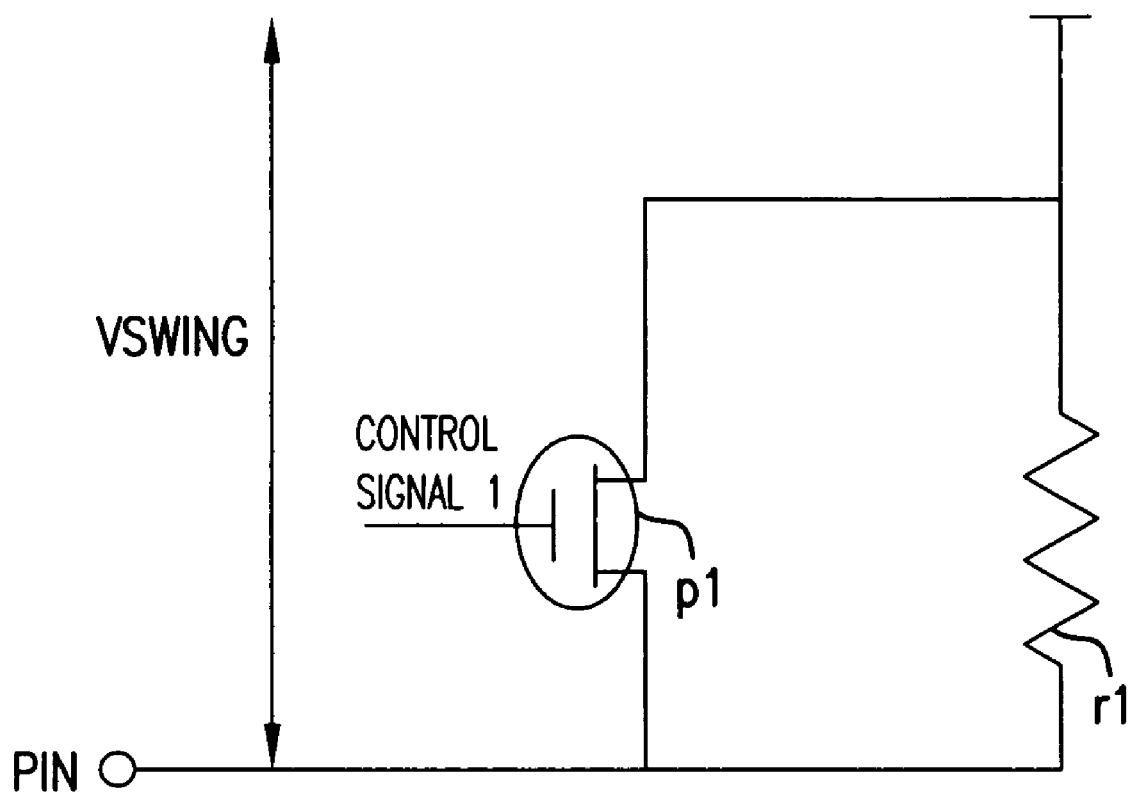
FIG. 3 is a circuit diagram showing the configuration of an on-die termination circuit of the second example of the prior art.
Figure 4A:
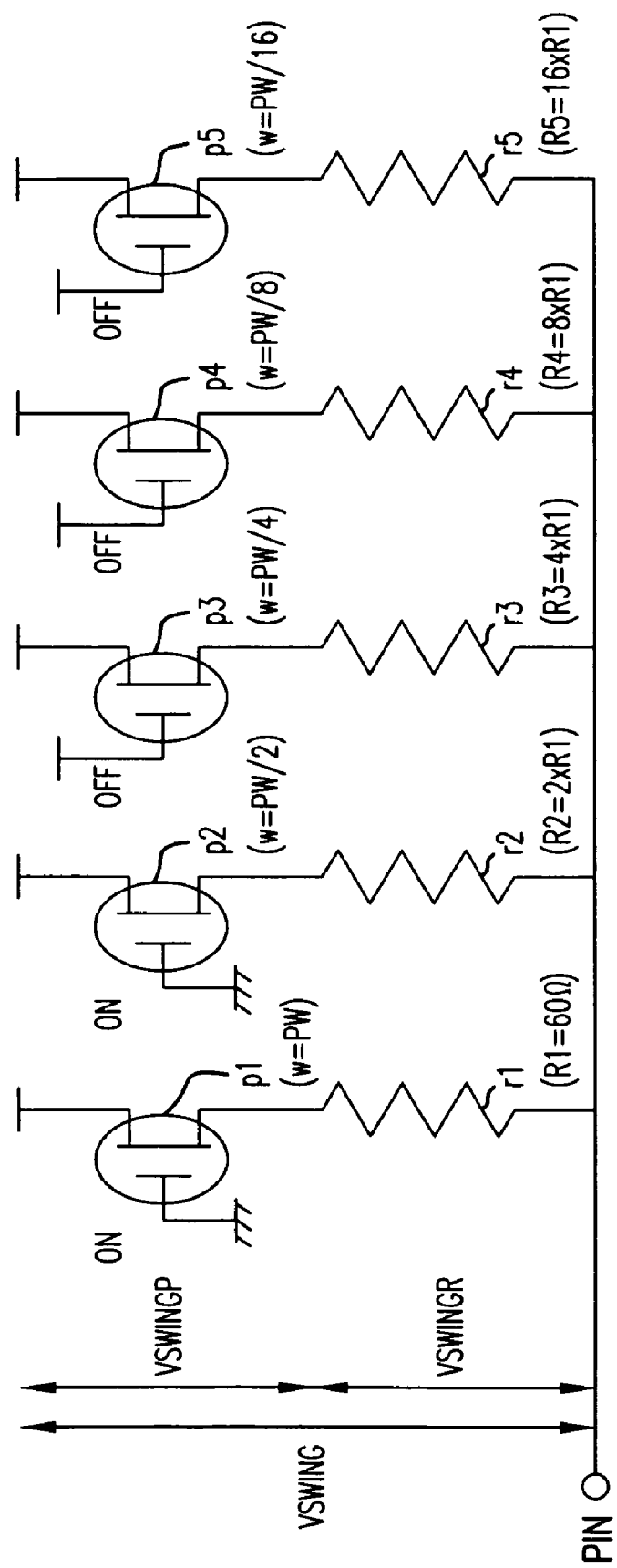
FIG. 4A is a circuit diagram showing, as the configuration of an on-die termination circuit of the third example of the prior art, an example of the state following adjustment of the termination resistance.
Figure 4B:
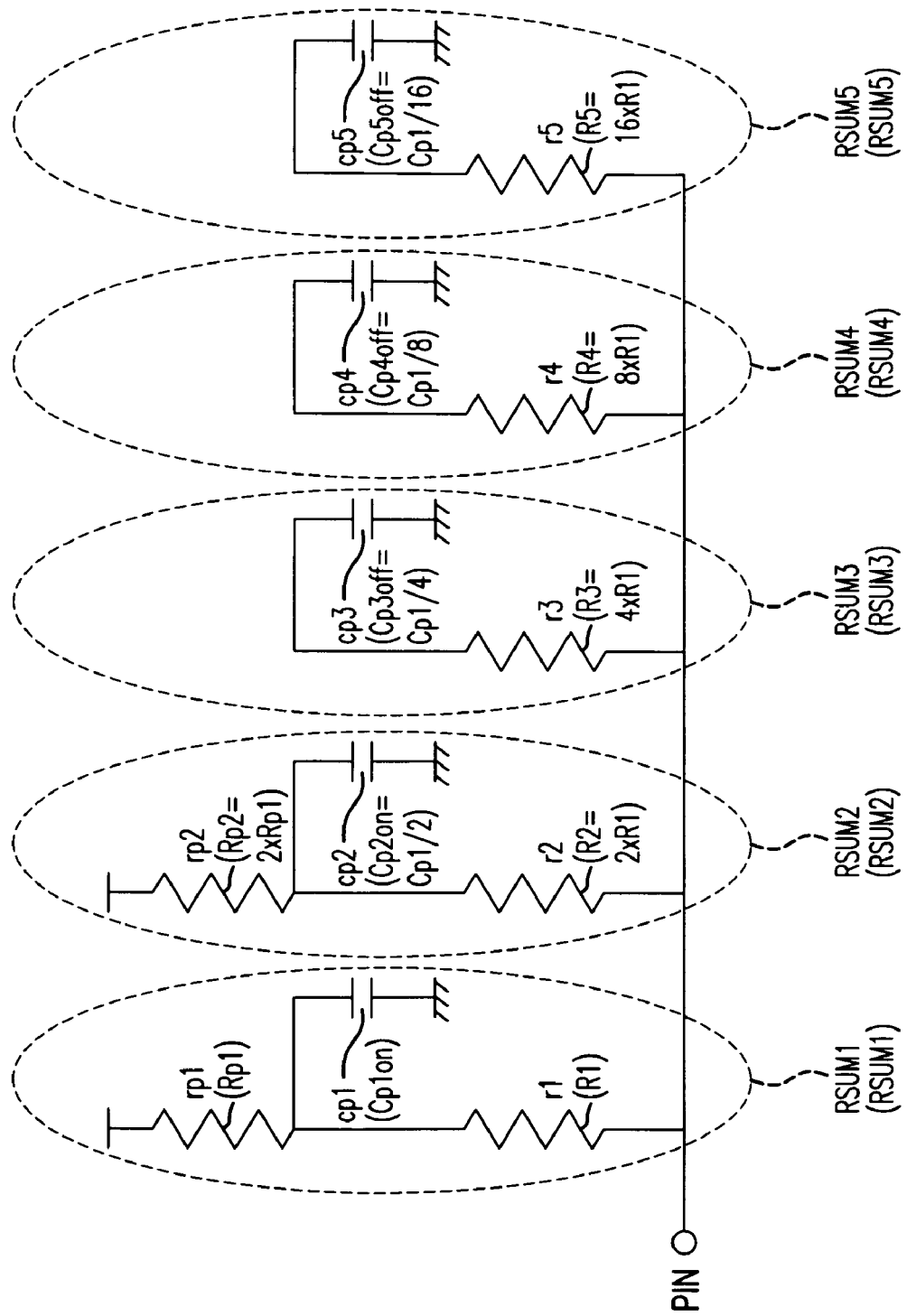
FIG. 4B is an equivalent circuit diagram in which the on-die termination circuit shown in FIG. 4A is represented by resistance elements and capacitance elements.
Figure 5A:
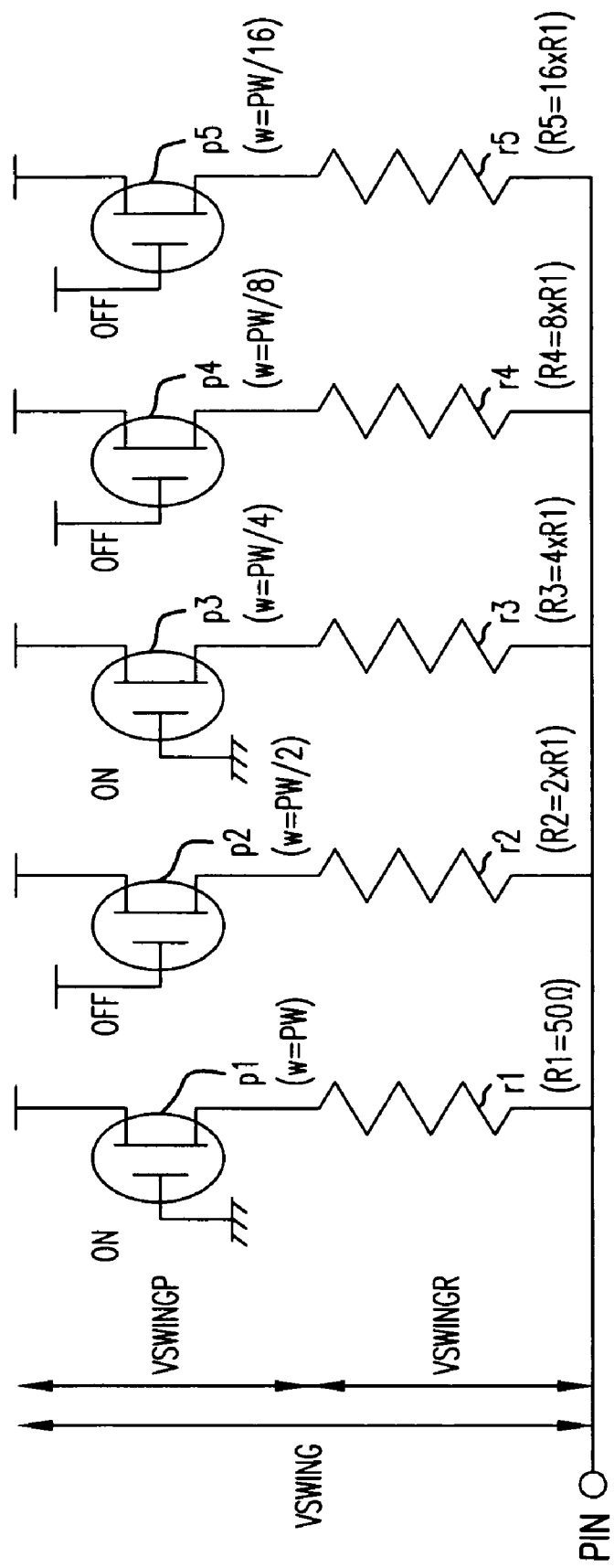
FIG. 5A is a circuit diagram showing, as the configuration of the on-die termination circuit of the third example of the prior art, another example of the state following adjustment of the termination resistance.
Figure 5B:
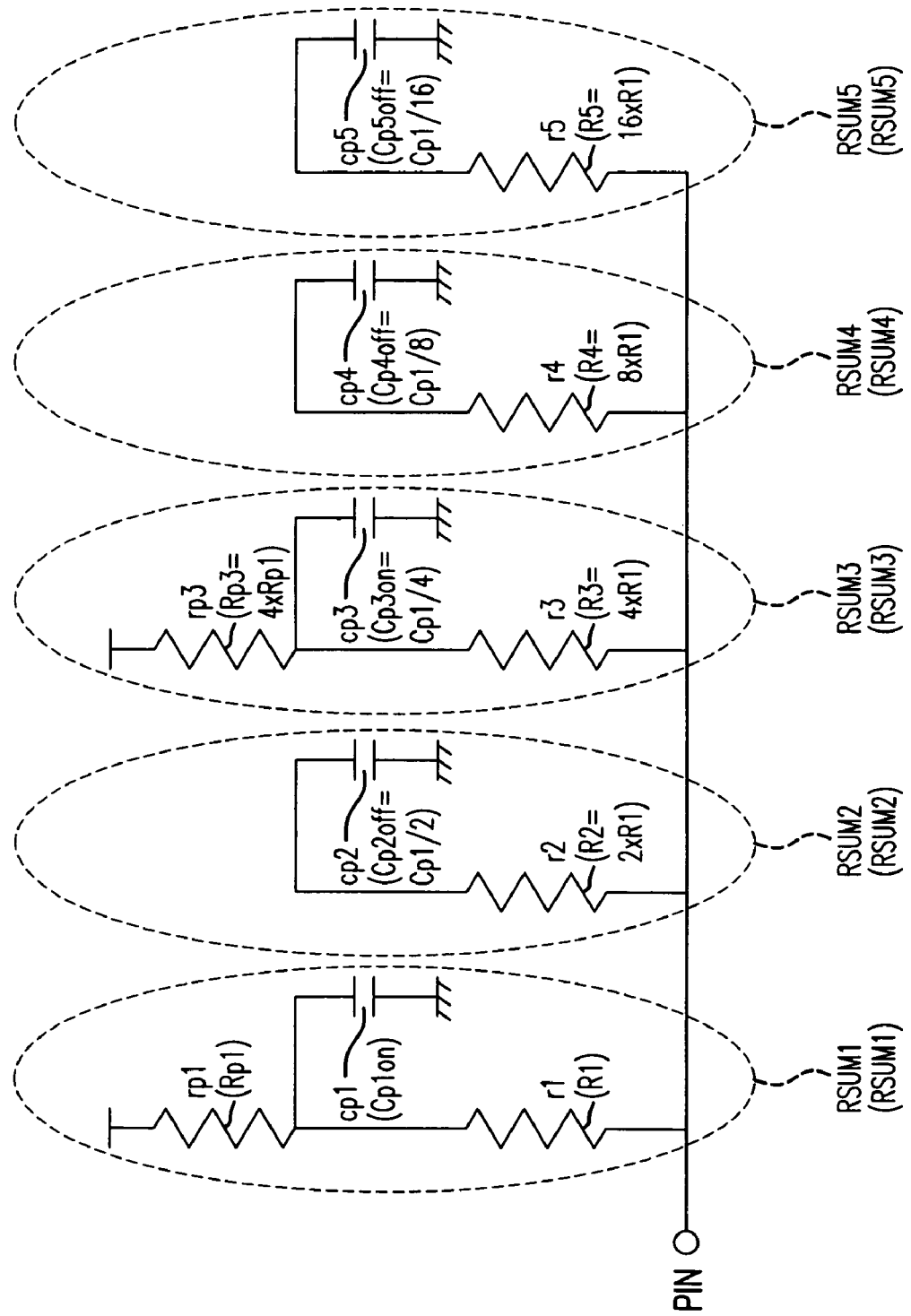
FIG. 5B is an equivalent circuit diagram in which the on-die termination circuit shown in FIG. 5A is represented by resistance elements and capacitance elements.
Figure 6:
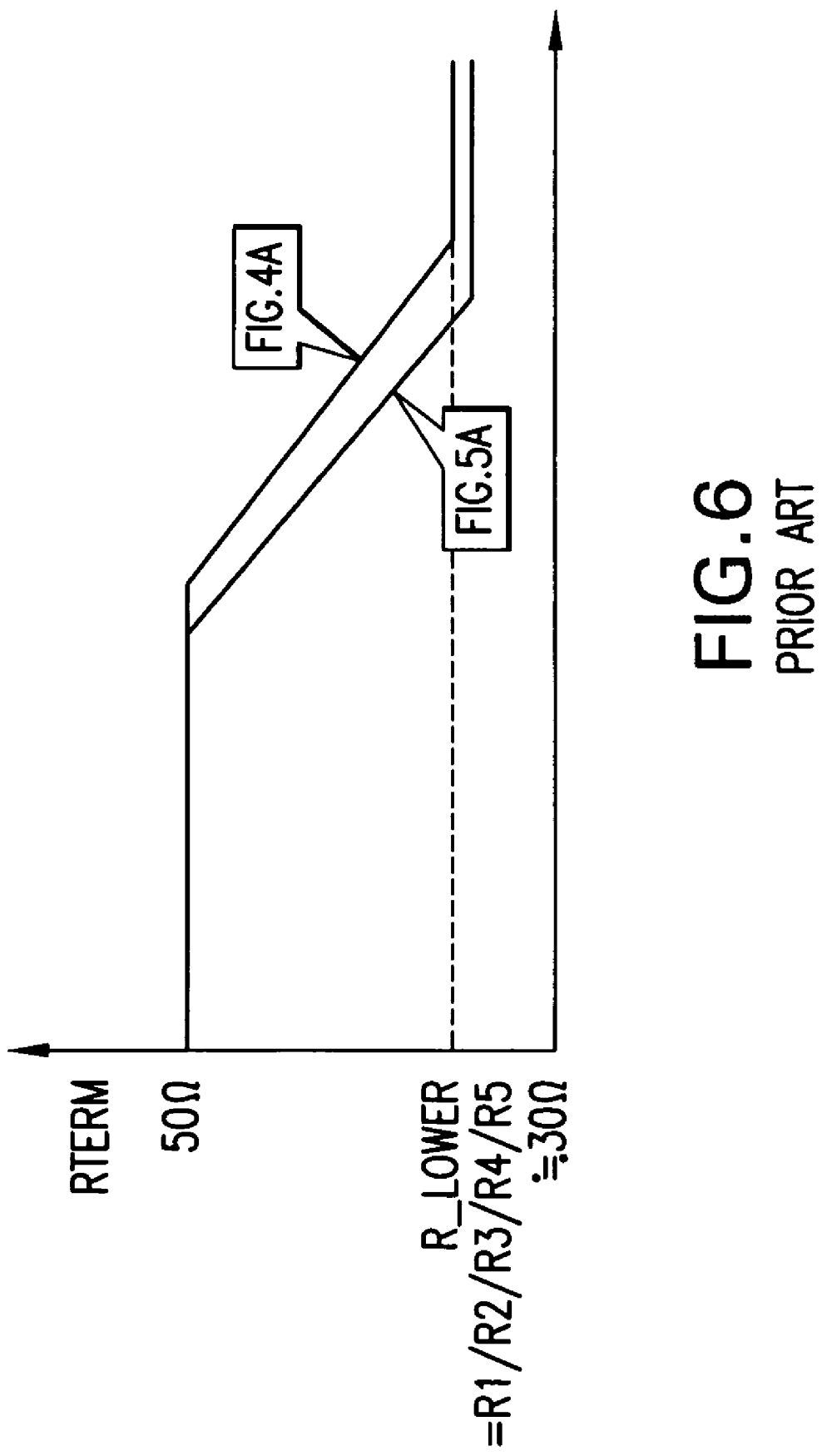
FIG. 6 is a graph showing the result of plotting impedance RTerm against frequency for each of the cases of FIG. 4A and FIG. 5A.
Figure 7A:
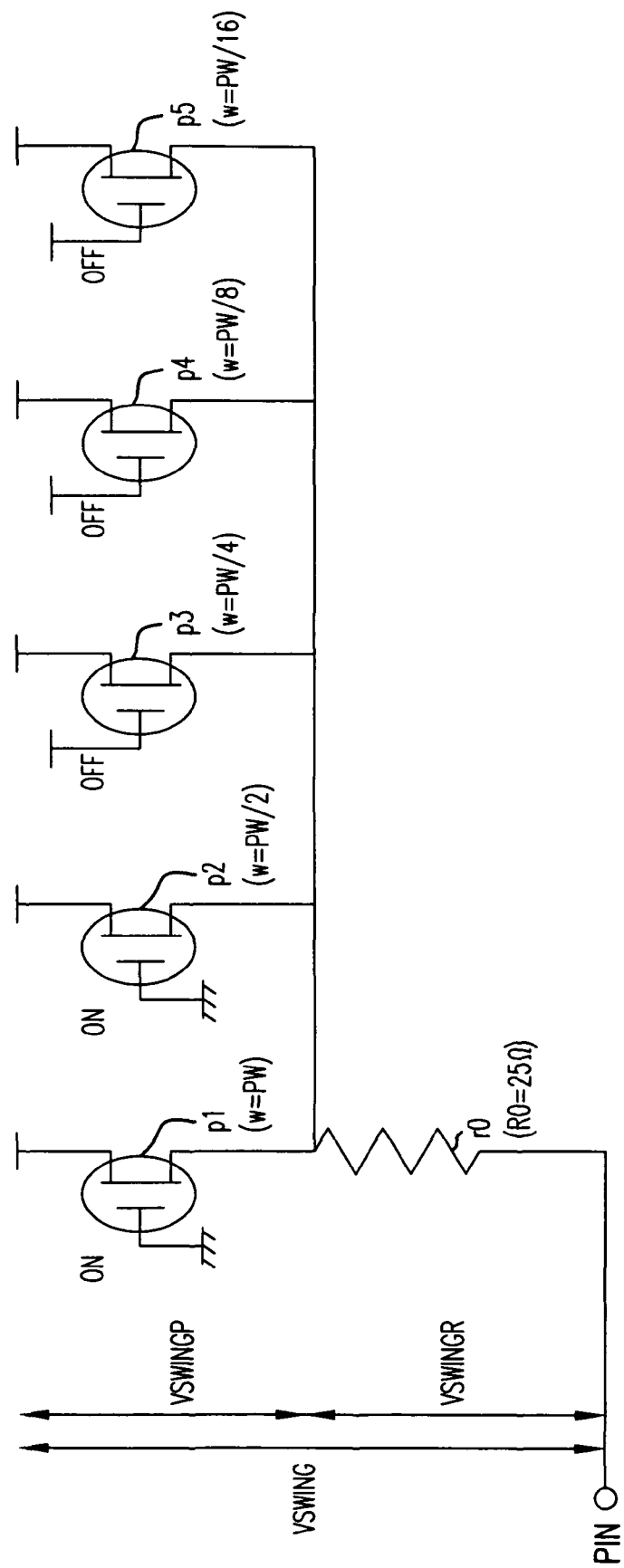
FIG. 7A is a circuit diagram showing, as the configuration of the on-die termination circuit of the fourth example of the prior art, an example of the state following adjustment of the termination resistance.
Figure 7B:
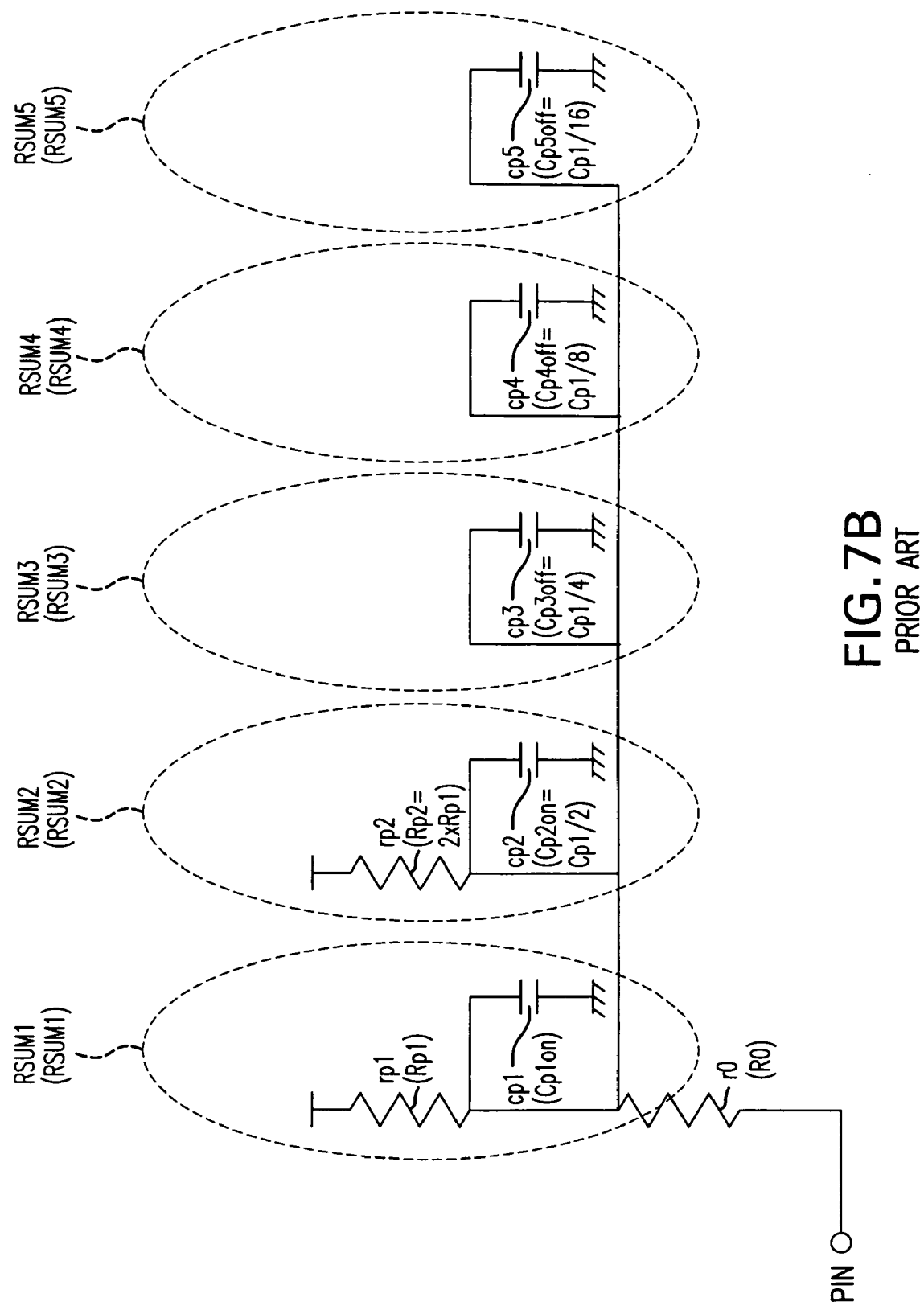
FIG. 7B is an equivalent circuit diagram in which the on-die termination circuit shown in FIG. 7A is represented by resistance elements and capacitance elements.
Figure 8A:
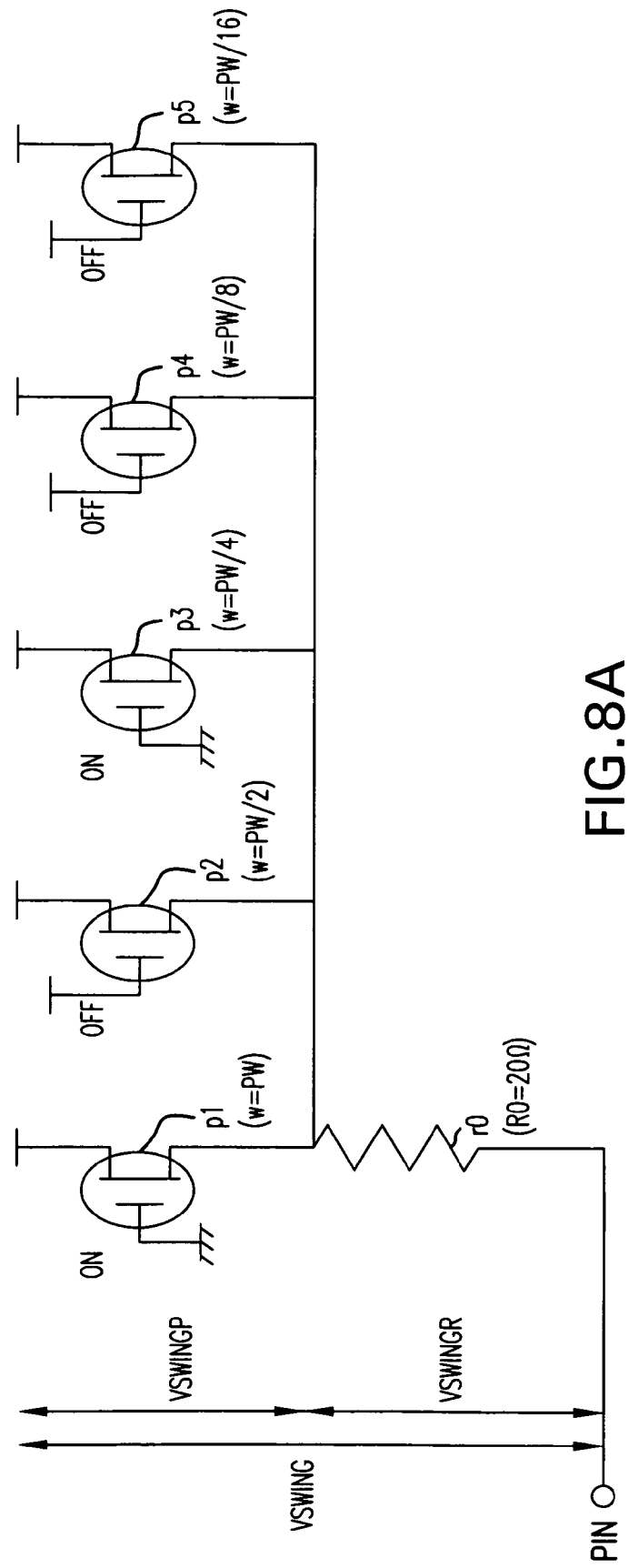
FIG. 8A is a circuit diagram showing, as the configuration of the on-die termination circuit of the fourth example of the prior art, another example of the state following adjustment of the termination resistance.
Figure 8B:
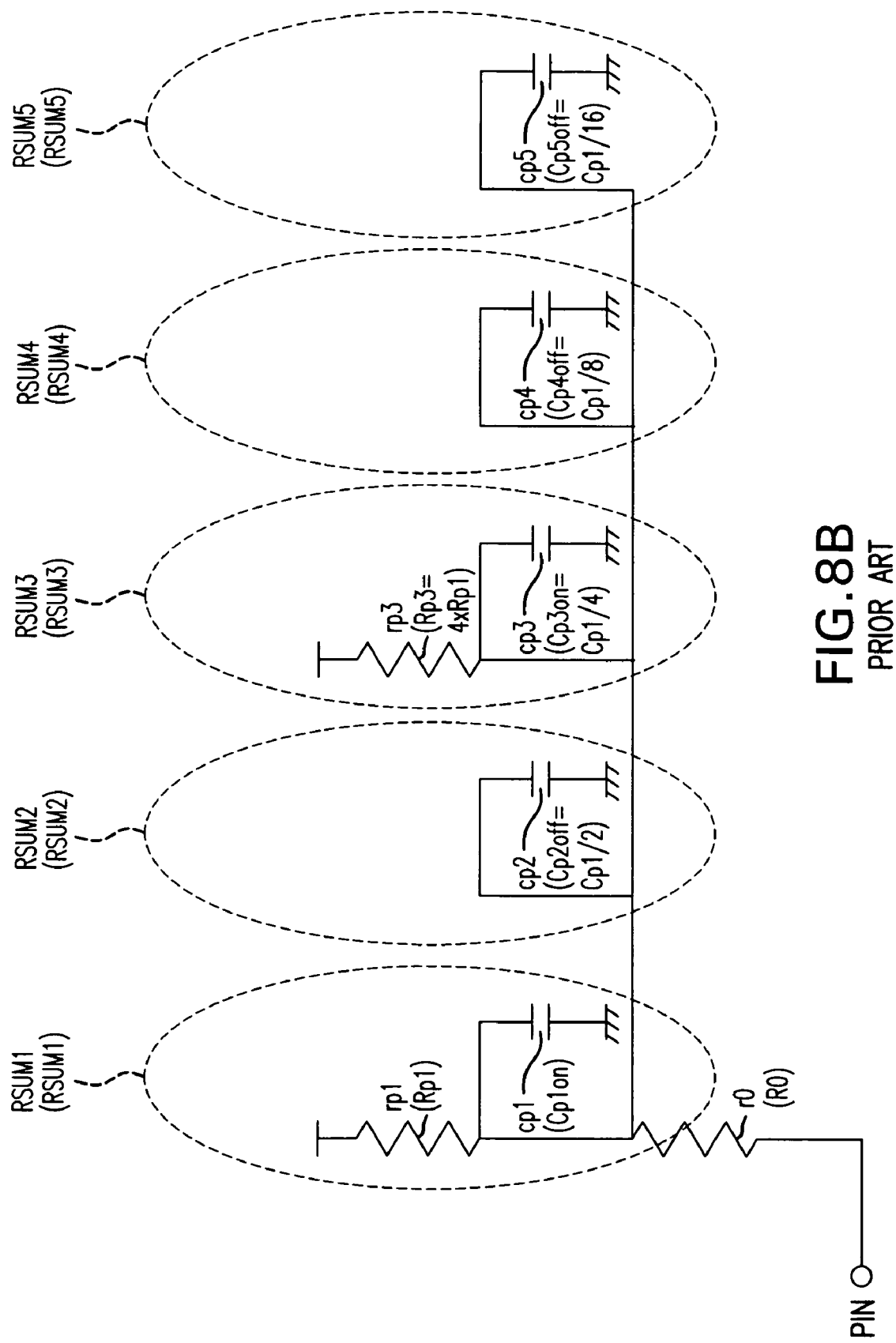
FIG. 8B is an equivalent circuit diagram in which the on-die termination circuit shown in FIG. 8A is represented by resistance elements and capacitance elements.
Figure 9:
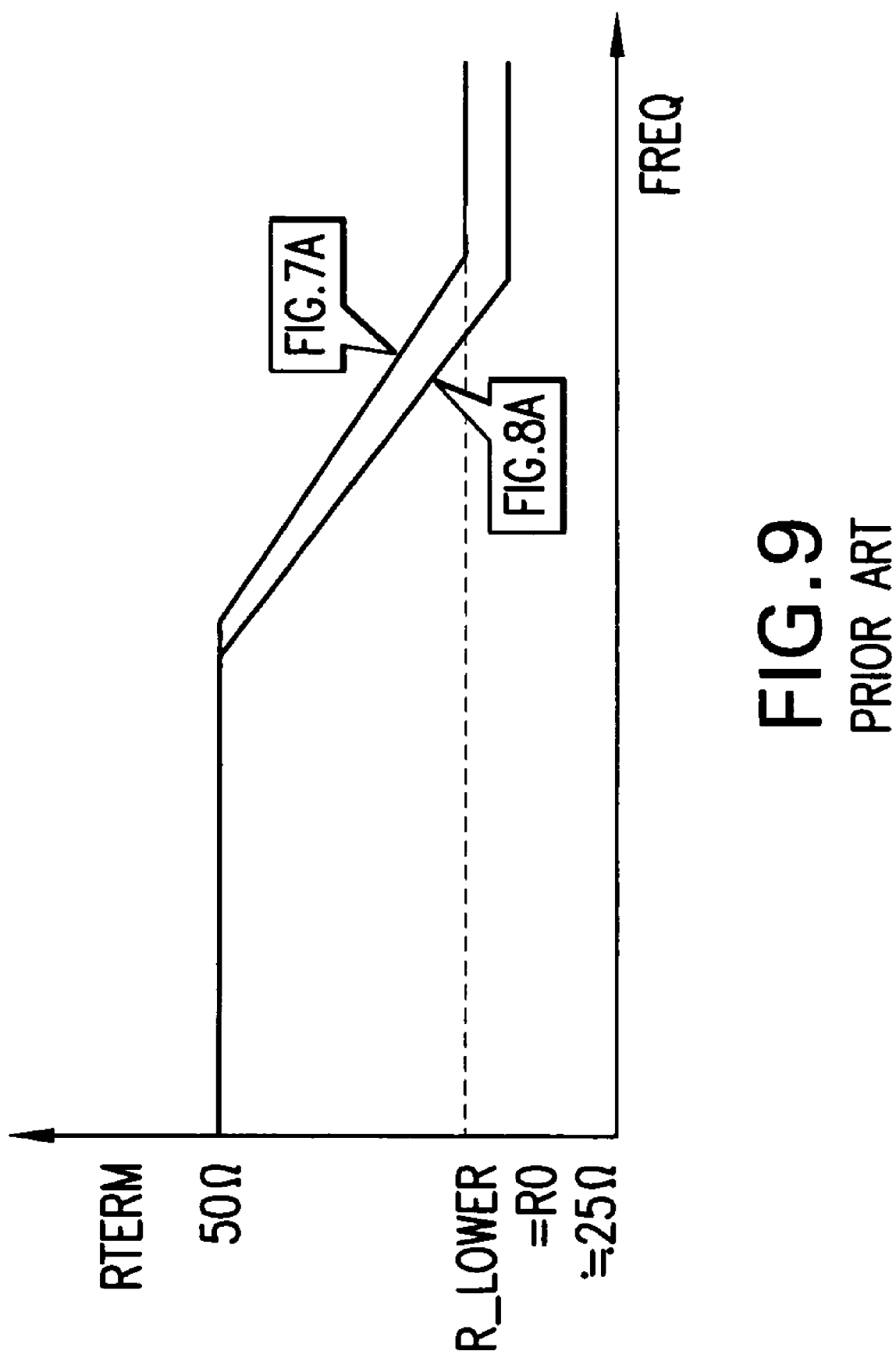
FIG. 9 is a graph showing the result of plotting impedance RTerm against frequency for each of the cases of FIG. 7A and FIG. 8A.
Figure 10A:
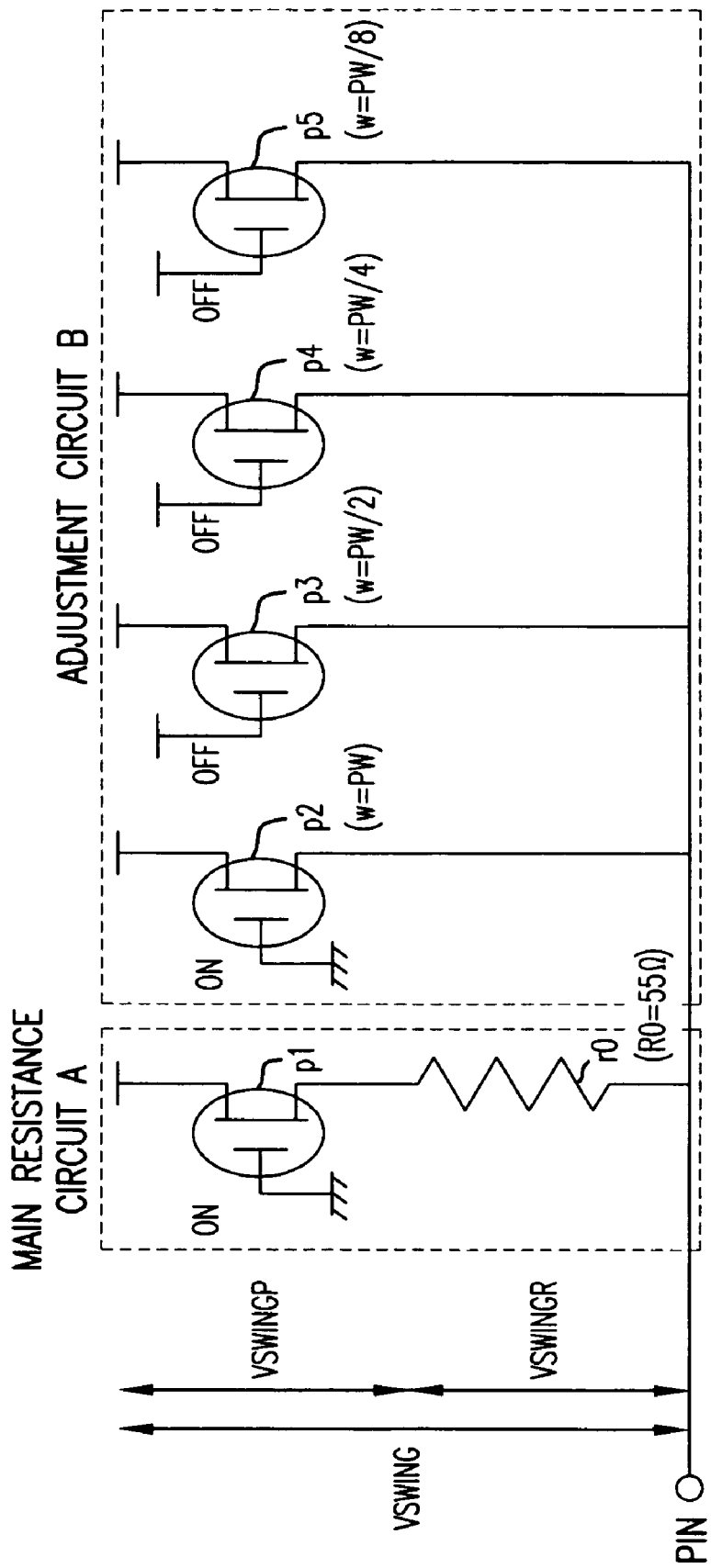
FIG. 10A is a circuit diagram showing, as the configuration of the on-die termination circuit of the first embodiment of the present invention, an example of the state following adjustment of the termination resistance.
Figure 10B:
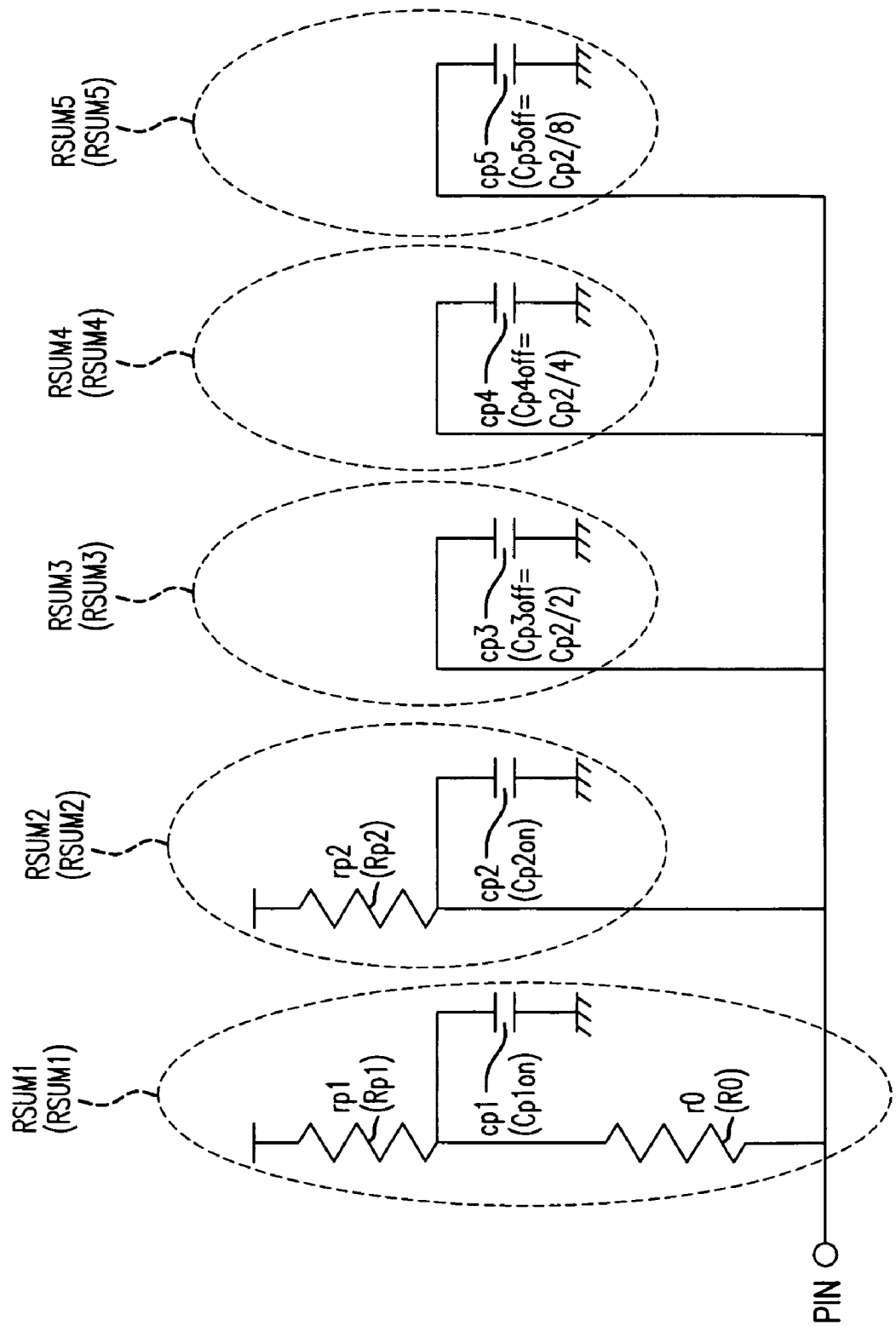
FIG. 10B is an equivalent circuit diagram in which the on-die termination circuit shown in FIG. 10A is represented by resistance elements and capacitance elements.
Figure 11A:
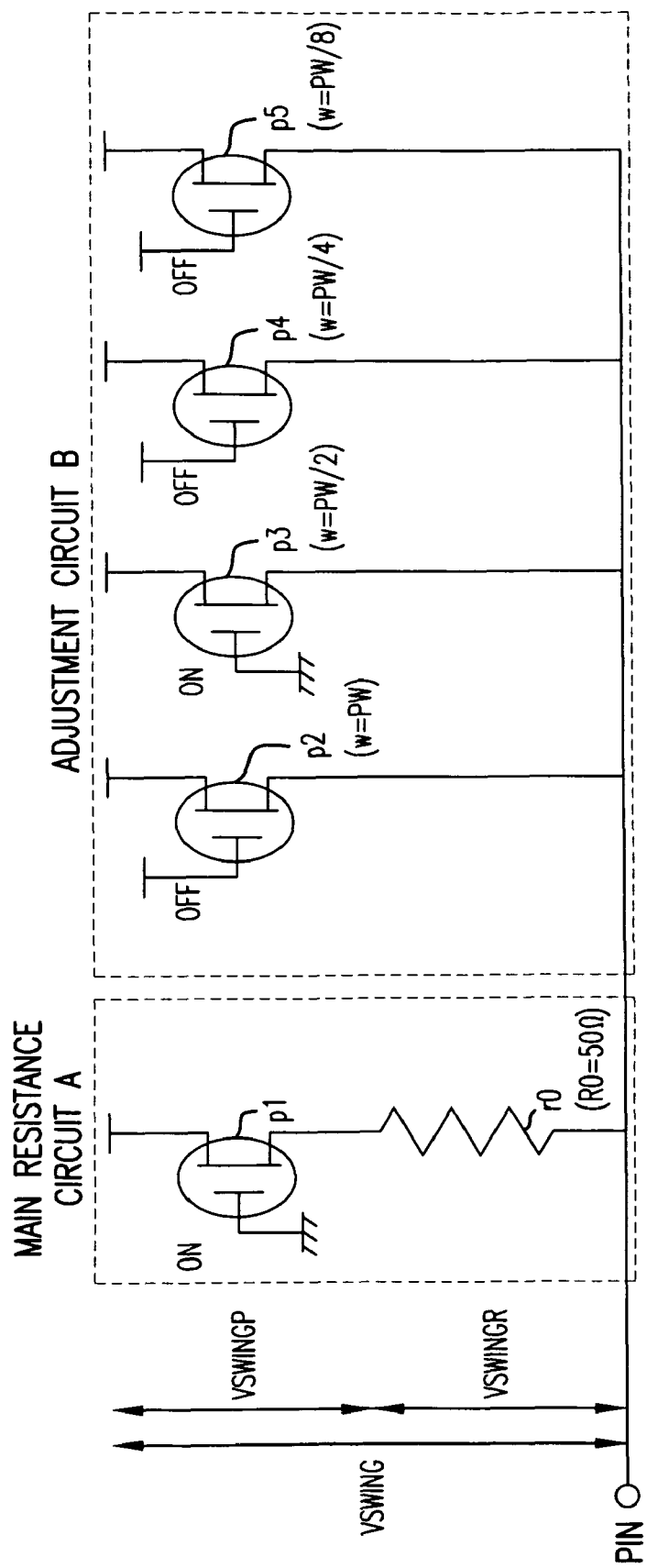
FIG. 11A is a circuit diagram showing, as the configuration of the on-die termination circuit of the first embodiment of the present invention, another example of the state following adjustment of the termination resistance.
Figure 11B:
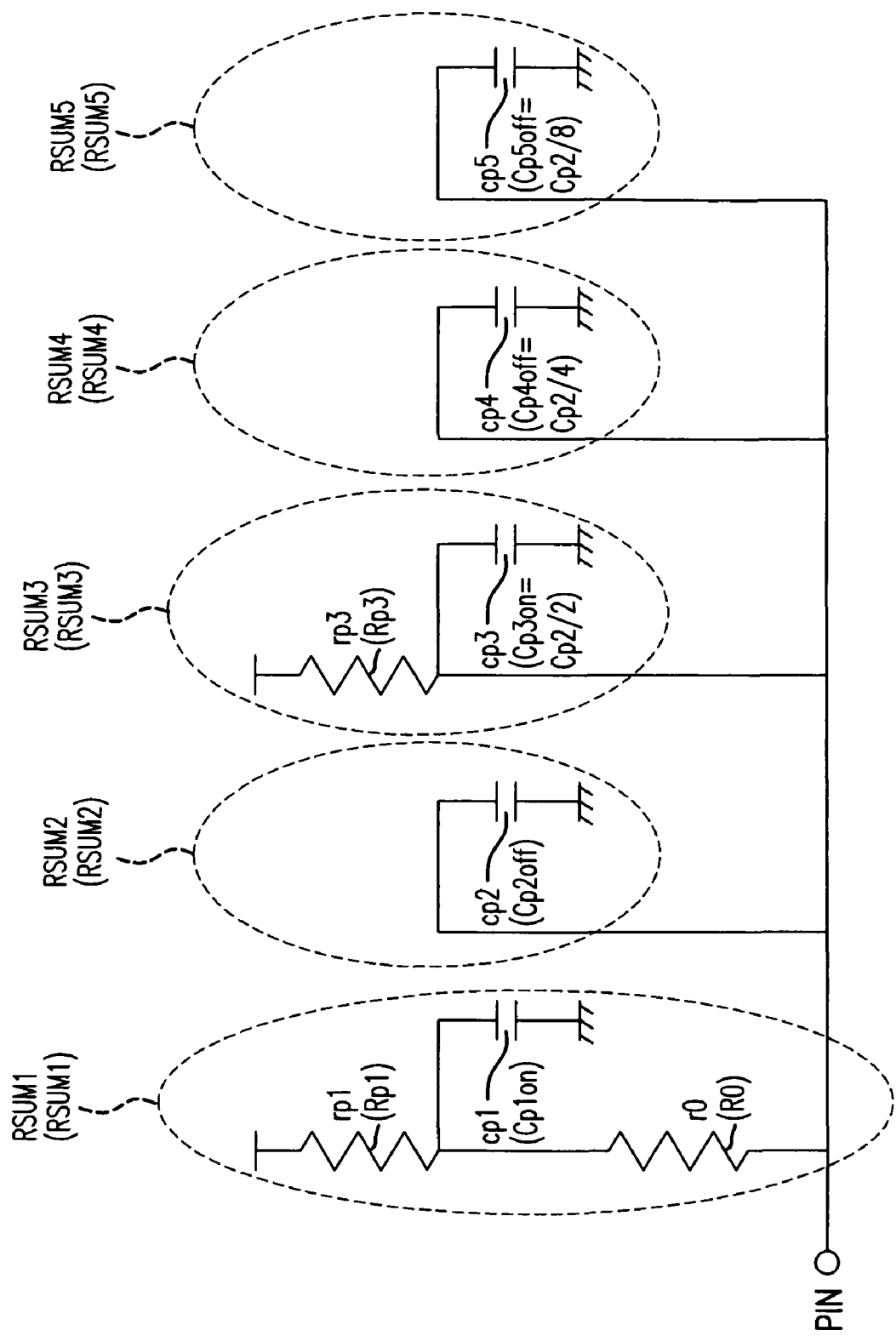
FIG. 11B is an equivalent circuit diagram in which the on-die termination circuit shown in FIG. 11A is represented by resistance elements and capacitance elements.

FIGS. 10A and 11A show the configuration of the on-die termination circuit of the first embodiment of the present invention. Although the circuit configuration itself is identical in FIGS. 10A and 11A, the transistors that are ON during the adjustment of termination resistance are different. FIG. 10B shows an equivalent circuit diagram in which FIG. 10A is represented by resistance elements and capacitance elements, and FIG. 11B shows an equivalent circuit diagram in which FIG. 11A is represented by resistance elements and capacitance elements.

As shown in FIGS. 10A and 11A, the on-die termination circuit of the present embodiment includes: main resistance circuit A made up from transistor p1, which is a PMOS transistor, and resistance element r0; and adjustment circuit B which is made up from transistors p2~p5, which are PMOS transistors, transistors p2~p5 being both connected together in parallel and connected in parallel to main resistance circuit A.

One terminal of resistance element r0 is connected to the terminal pin, and the other terminal is connected to the drain terminal of transistor p1. The terminal pin is the terminal that connects the on-die termination circuit to the transfer bus.

The source terminal of transistor p1 is connected to the termination voltage, and a control signal for the ON/OFF control of transistor p1 is applied as input to the gate terminal. This transistor p1 always turns ON when the on-die termination circuit is to be placed in the ON state, and turns OFF when the on-die termination circuit is to be placed in the OFF state.

Although main resistance circuit A is of a configuration in which one resistance element r0 and one transistor p1 are connected in a series in the present embodiment, the present invention is not limited to this form. In other words, instead of providing one resistance element r0, a plurality of resistance elements may be provided that are connected in a series or connected in parallel. Instead of providing one transistor p1, a plurality of transistors may be provided that are connected in a series or connected in parallel. Alternatively, a plurality of circuits may be provided, each circuit having one resistance element r0 and one transistor p1 connected in a series, and these circuits may be connected together in a series or in parallel. When a plurality of transistors is provided in main resistance circuit A, the transistors need not all be in the ON state when the on-die termination circuit is in the ON state.

Because the termination voltage is assumed to be power supply voltage VDD in the present embodiment, a PMOS transistor is used in transistor p1, but the present invention is not limited to this form. In other words, because the termination voltage is arbitrary, an NMOS transistor, a CMOS transistor, another type of transistor, or a combination of these transistors may be used as transistor p1 according to the termination voltage.

The drain terminals of transistors p2~p5 are connected directly to the terminal pin, and the source terminals are connected to the termination voltage. In addition, control signals for the ON/OFF control of transistors p2~p5 are applied to the gate terminals. These PMOS transistors p2~p5 are switched ON and OFF when the on-die termination circuit is to be placed in the ON state and the termination resistance adjusted.

Unit circuits rsum2~rsum5 are each composed of transistors p2~p5 and are of a binary configuration in which impedances Rsum2~Rsum5 of each circuit are in the following relation:

$$Rsum2 = Rsum3/2 = Rsum4/4 = Rsum5/8$$

If the width w of transistor p2 is assumed to be PW, the widths w of transistors p3, p4, and p5 are PW/2, PW/4, and PW/8, respectively. In addition, if the resistance of resistance component rp2 of transistor p2 is assumed to be Rp2, resistances Rp3, Rp4, and Rp5 of resistance components rp3, rp4, and rp5 of transistors p3, p4, and p5 are 2×Rp2, 4×Rp2, and 8×Rp2, respectively. Finally, if the capacitance of capacitance component cp2 of transistor p2 is assumed to be Cp2, the capacitances Cp3, Cp4, and Cp5 of capacitance components cp3, cp4, and cp5 of transistors p3, p4, and p5 are Cp2/2, Cp2/4, and Cp2/8, respectively.

In the present embodiment, a total of five transistors were used to set the termination resistance to 50Ω: one transistor p1 that makes up a part of main resistance circuit A and four transistors p2~p5 that make up adjustment circuit B, but it will be obvious that no problem will be encountered if the number of transistors that make up adjustment circuit B is more or less than four.

Further, PMOS transistors were used for transistors p2~p5 because the termination voltage was assumed to be the power supply voltage VDD, but the present invention is not limited to this form. In other words, the termination voltage is arbitrary, and NMOS transistors, CMOS transistors, other types of transistors, or a combination of these transistors may be used as transistors p2~p5 according to the termination voltage.

However, taking into consideration the fluctuation in termination resistance resulting from variations arising in manufacturing steps in the on-die termination circuit, it is believed to be sufficient if a termination resistance within a range of ±25% of the target value can be adjusted to the target value.

If the target value of the termination resistance is assumed to be 50Ω, the resistance of resistance element r0 of main resistance circuit A can be set to, for example, R0=66.67Ω to adjust a termination resistance that is within the range of 50Ω±25% to 50Ω.

More specifically, when the termination resistance is a value that is 25% less than the target value of 50Ω, the resistance R0 of resistance element r0 is 66.67Ω×0.75=50Ω, whereby the termination resistance can be adjusted to 50Ω.

In contrast, when the termination resistance is a value 25% greater than the target value 50Ω, the resistance of resistance element r0 is R0=66.67Ω×1.25=83.34Ω. In this state, the resistance of the entirety of transistors p2~p5 that are connected in parallel to resistance element r0 should be set to 125Ω to adjust the termination resistance to 50Ω. When only transistor p2 is turned ON to set the resistance of the entirety of transistors p2~p5 to 125Ω, resistance Rp2 of transistor p2 should be set to 125Ω. Alternatively, when transistors p2, p3, and p5 are all turned ON, resistances Rp2, Rp3, Rp4, and Rp5 of transistors p2, p3, p4, and p5 are 234Ω, 486Ω, 936Ω, and 1872Ω, respectively.

Accordingly, if the minimum value of resistances Rp2~Rp5 of transistors p2~p5 of adjustment circuit B is assumed to be 125Ω when the target value of the termination resistance is 50Ω and the resistance R0 of resistance element r0 of main resistance circuit A is 66.67Ω, a termination resistance within the range of the target value 50Ω±25% can be adjusted to the target value. More specifically, resistances Rp2~Rp5 of transistors p2~p5 should be set to at least 2.5 times the target value of the termination resistance, whereby the size of transistors p2~p5 should be sufficiently smaller than transistor p1.

The following explanation regards the operation of the on-die termination circuit of the present embodiment.

Explanation first regards the operation when adjusting the termination resistance.

FIG. 10A shows the state when two transistors, transistor p1 of main resistance circuit A and transistor p2 of adjustment circuit B, are turned ON so as to adjust the termination resistance of the entirety of the on-die termination circuit to 50Ω with respect to the terminal pin. In this case, it is assumed that the resistance R0 of resistor r0 of main resistance circuit A is 55Ω, the resistance Rp1 of resistance component rp1 of transistor p1 is 55Ω, and the resistance of the entirety of main resistance circuit A is 60Ω. It is further assumed that the resistance Rp2 of the resistance component rp2 of transistor p2 after adjustment is 300Ω.

In the case of FIG. 10A, taking the frequency characteristic into consideration, impedance Rsum1 of unit circuit rsum1 that is composed of main resistance circuit A and impedances Rsum2~Rsum5 of unit circuits rsum2~rsum5 that are composed of transistors p2~p5 of adjustment circuit B can be represented as follows:

$$Rsum1=R0+(Rp1//1/(sCp1on))$$

$$Rsum2=Rp2$$

$$Rsum3>>Rp2$$

$$Rsum4>>Rp2$$

$$Rsum5>>Rp2$$

In contrast, FIG. 11A shows the state in which, in the manufacturing process, some variation occurs in resistance R0 of 50Ω of resistance element r0 of main resistance circuit A such that the resistance of the entirety of main resistance circuit A is 55Ω, and this resistance is adjusted to correct the termination resistance to 50Ω. In this case, transistor p2 is OFF and transistor p3 is ON. As previously explained, resistance Rp3 of resistance component rp3 of transistor p3 is twice the resistance Rp2 of resistance component rp2 of transistor p2, and resistance Rp3 is therefore assumed to be 600Ω.

In the case of FIG. 11A, taking the frequency characteristic into consideration, impedance Rsum1 of unit circuit rsum1 that is composed of main resistance circuit A and impedances Rsum2~Rsum5 of unit circuits rsum2~rsum5 that are composed of transistors p2~p5 of adjustment circuit B can be represented as follows:

$$Rsum1=R0+(Rp1//1/(sCp1on))$$

$$Rsum2>>Rp3$$

$$Rsum3=Rp3$$

$$Rsum4>>Rp2$$

$$Rsum5>>Rp2$$

In addition, impedance RTerm of the entirety of the on-die termination circuit with respect to the terminal pin can be represented as follows:

$$RTerm=Rsum1//Rsum2//Rsum3//Rsum4//Rsum5$$

It can therefore be seen that in the calculation of impedance RTerm, the values of impedances Rsum1~Rsum5 can be ignored when these values are extremely large.

Figure 12:
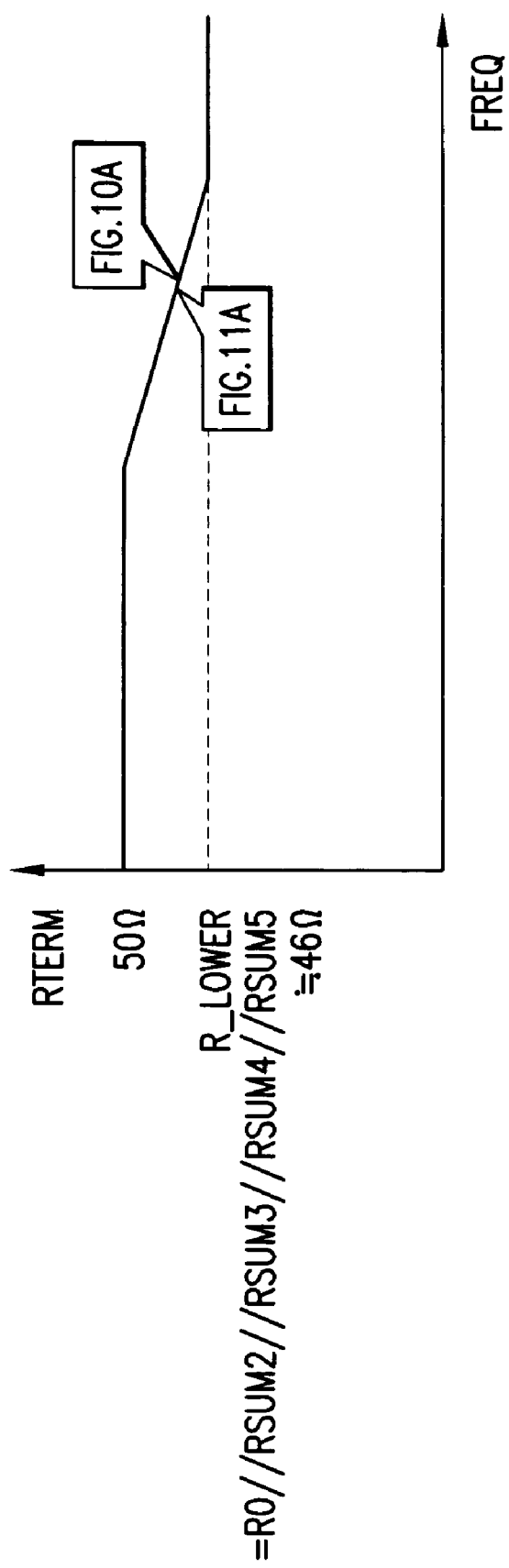
FIG. 12 is a graph showing the result of plotting impedance RTerm against frequency for each of the cases of FIG. 10A and FIG. 11A.

FIG. 12 shows the result of plotting impedance RTerm against frequency for each of the cases of FIG. 10A and FIG. 11A.

As shown in FIG. 12, R_lower, at which RTerm reaches a minimum value, is the point at which the impedance stabilizes in the high-frequency region. In the cases of both FIG. 10A and FIG. 11A, this R_lower can be approximated by the resistance of the resistance component of RTerm that is obtained by the equation above.

In other words, impedance RTerm of the high-frequency region for the case of FIG. 10A can be represented as follows:

$$RTerm \approx R0//Rp2=50\Omega/300\Omega \approx 46.5\Omega$$

Similarly, impedance RTerm in the high-frequency region for the case of FIG. 11A can be represented as follows:

$$RTerm \approx R0//Rp2=50\Omega/600\Omega \approx 46.2\Omega$$

In this way, when the termination resistance is adjusted in the present embodiment, the impedance of transistors that have been turned OFF by the adjustment can be ignored, whereby the frequency dependency of the termination resistance can be reduced to a low level. Thus, in either of the cases of FIG. 10 and FIG. 11A, impedance RTerm that stabilizes in the high-frequency region is approximately 46Ω and can be maintained at a value that is relatively close to the target of 50Ω.

In the case of FIG. 11A, in contrast to FIG. 10A, the transistor that is turned OFF when adjusting the termination resistance switches from transistor p2 to transistor p3, resulting in a different parasitic element configuration of this part. However, because the impedance of the transistor that is turned OFF can be ignored, the termination resistance of the entirety of the on-die termination circuit is substantially uniform, whereby fluctuation of the termination resistance in the high-frequency region can be suppressed despite both the switch from transistor p2 to transistor p3 and the difference in the parasitic element configuration.

In the present embodiment, moreover, the resistance of transistors p2~p5 is highly dependent on Vswing because adjustment circuit B is made up of only transistors p2~p5. However, as previously explained, a termination resistance within a range of the target value ±25% can be adjusted to the target value in the present embodiment. In other words, fluctuation that is within ±¼ of the target value can be absorbed. As a result, even when the termination resistance fluctuates up to a maximum of 30% under the influence of Vswing, the influence that is received is held to 30%/4=7.5%.

The following explanation regards the operation when the on-die termination circuit is placed in the OFF state.

When the on-die termination circuit is placed in the OFF state, transistors p1~p5 are all turned OFF. Transistors p1~p5 are PMOS transistors, and the termination voltage, which is the power supply voltage VDD, is connected to the source terminals of transistors p1~p5. As a result, when the voltage across the gate and source in transistors p1~p5 is 0, transistors p1~p5 enter the OFF state, and the gate terminals of all transistors p1~p5 become the power supply level.

As described hereinabove, the on-die termination circuit of the present embodiment is of a configuration in which, when adjusting the termination resistance, the amount of fluctuation of the resistance of resistance element r0 of main resistance circuit A is adjusted by turning ON and OFF transistors p2~p5 of adjustment circuit B.

In other words, transistors p2~p5 of adjustment circuit B are provided to adjust the amount of fluctuation of the resistance of resistance element r0, and because these transistors p2~p5 are connected in parallel to main resistance circuit A, they can be set to a high resistance. More specifically, as previously described, these transistors p2~p5 can be set to at least 2.5 times the target value of the termination resistance.

Because the resistance of transistors p2~p5 of adjustment circuit B can be thus set to a high value, the impedance of the transistors that are OFF among transistors p2~p5 of adjustment circuit B during adjustment of the termination resistance in the circuit configuration of the present embodiment is sufficiently high and can be ignored. The frequency dependence of the on-die termination circuit as a whole can therefore be reduced to a low level.

Accordingly, because fluctuation of termination resistance according to frequency can be suppressed when adjusting the termination resistance, the termination resistance can be maintained at a value that is relatively close to the target value even in the high-frequency region.

Despite the difference in the transistors that are turned ON during adjustment of the termination resistance and the consequent difference in the parasitic element configuration of these parts, the impedance of transistors that are OFF can be ignored. As a result, the termination resistance of the entire on-die termination circuit can be kept substantially uniform, and fluctuation of the termination resistance caused by the difference in the parasitic element configuration can be suppressed.

Second Embodiment

Figure 13:
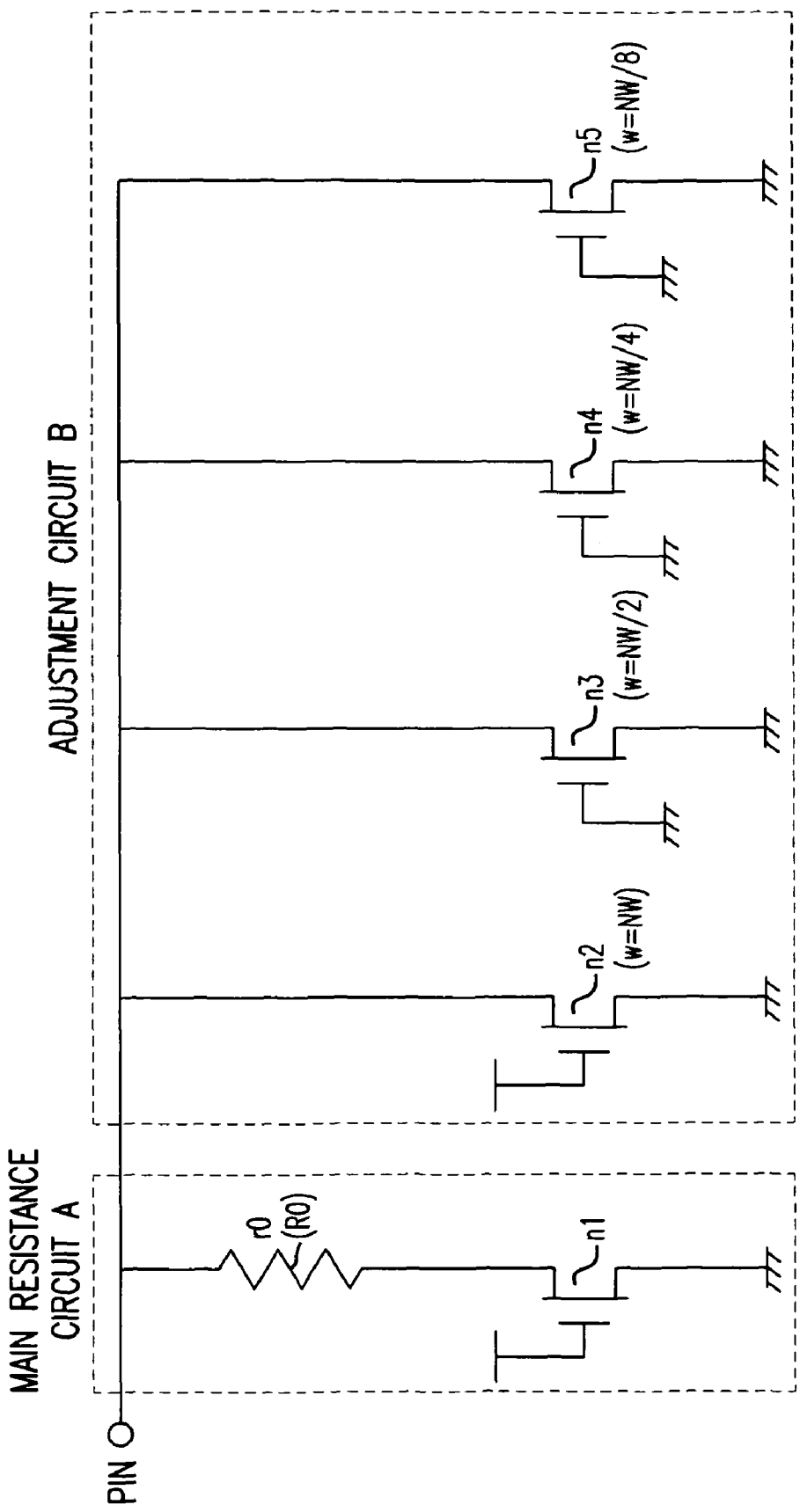
FIG. 13 is a circuit diagram showing the configuration of the on-die termination circuit of the second embodiment of the present invention.

FIG. 13 shows the configuration of the on-die termination circuit of the second embodiment of the present invention.

As shown in FIG. 13, the on-die termination circuit of this embodiment differs from the first embodiment in that the termination voltage is changed from the power supply voltage VDD to GND, and transistors p1~p5 are changed to transistors n1~n5, which are NMOS transistors.

The present embodiment is also assumed to be of a binary configuration. If the width w of transistor n2 is assumed to be NW, the width w of each of transistors n3, n4, and n5 is NW/2, NW/4, and NW/8, respectively.

Third Embodiment

Figure 14:
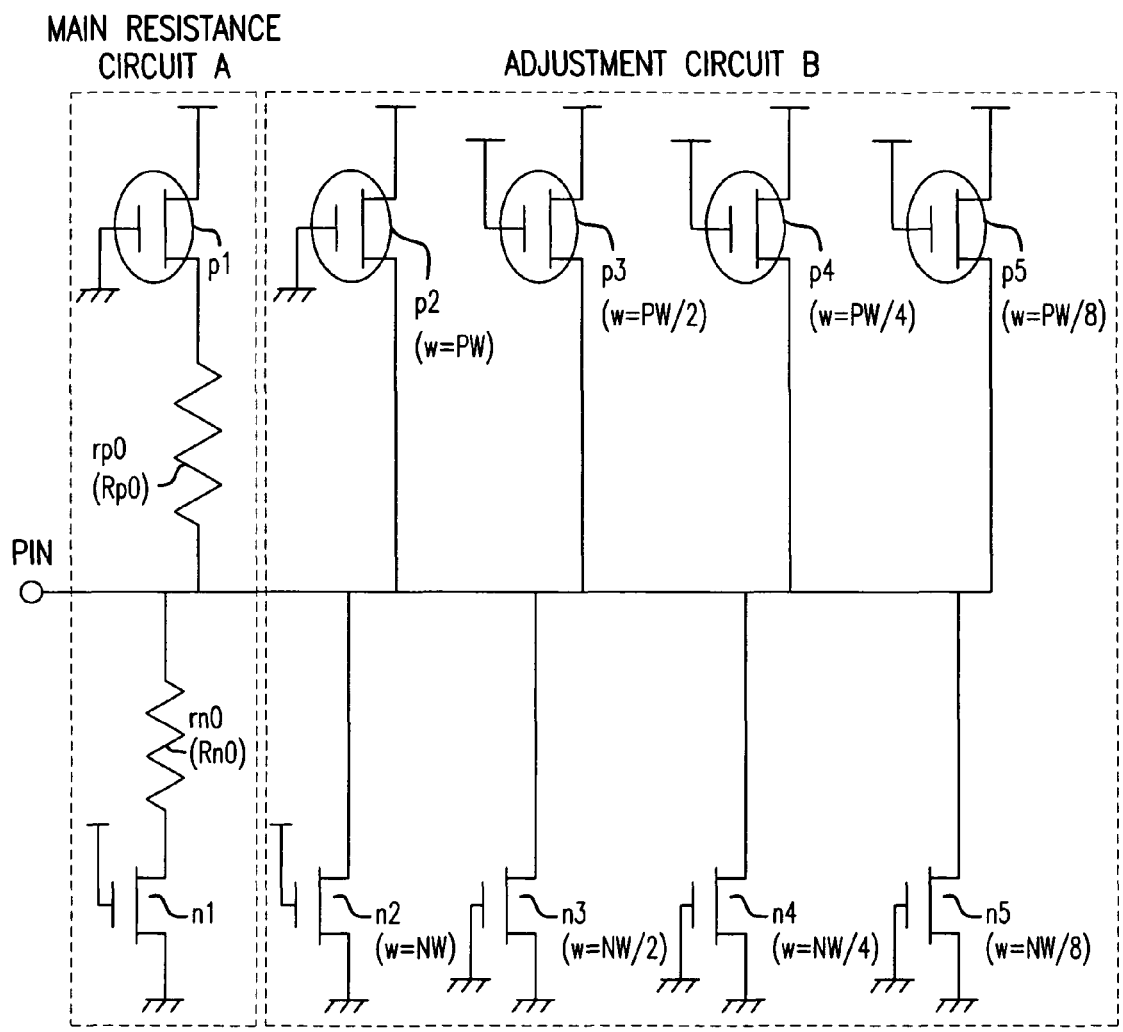
FIG. 14 is a circuit diagram showing the configuration of the on-die termination circuit of the third embodiment of the present invention.

FIG. 14 shows the configuration of the on-die termination circuit of the third embodiment of the present invention.

As shown in FIG. 14, the on-die termination circuit of this embodiment is a device in which a circuit whose termination voltage is the power supply voltage VDD, as in the first embodiment, and a circuit whose termination voltage is GND, as in the second embodiment, are associated by sharing the terminal pin. The termination voltage can thus be set to ½ of the level of power supply voltage VDD.

In addition, this embodiment is also assumed to be of a binary configuration, but the relation of the widths w of transistors p1~p5 is the same as in the first embodiment and the relation of the widths of transistors n1~n5 is the same as in the second embodiment.

Fourth Embodiment

Figure 15:
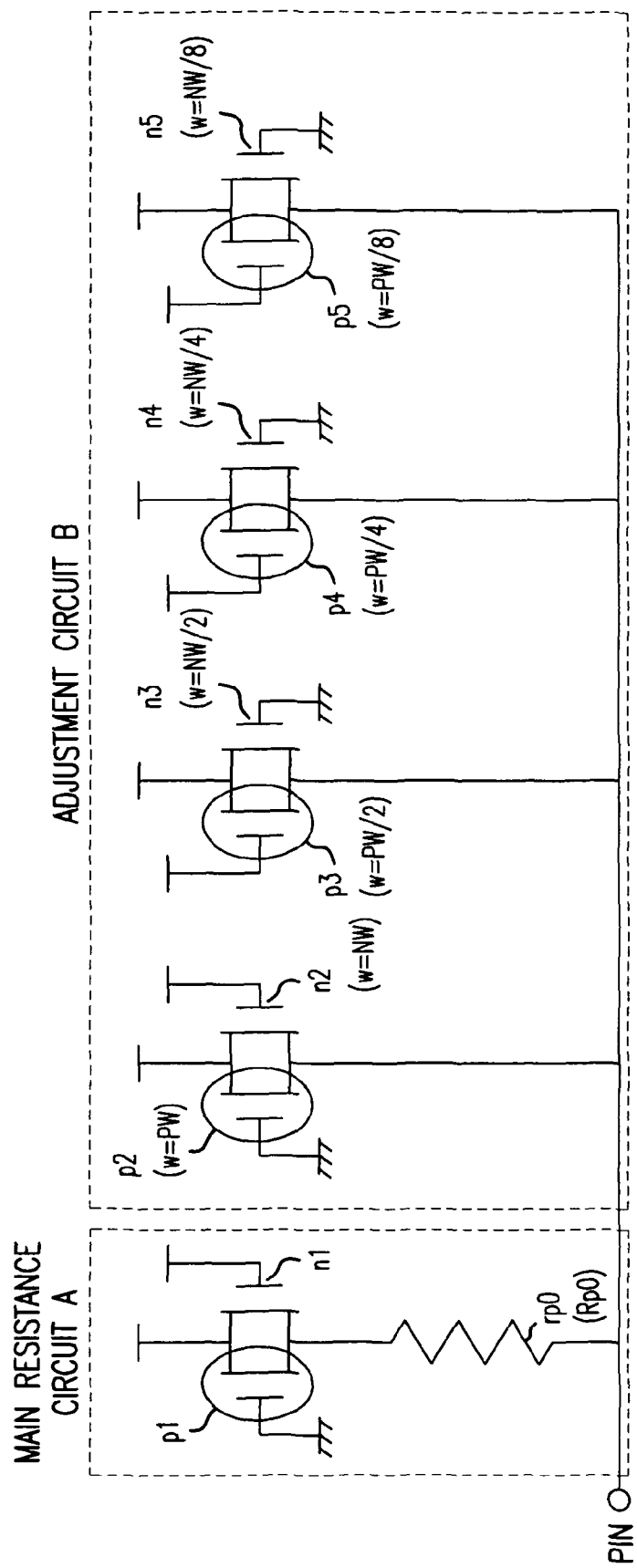
FIG. 15 is a circuit diagram showing the configuration of the on-die termination circuit of the fourth embodiment of the present invention.

FIG. 15 shows the configuration of the on-die termination circuit of the fourth embodiment of the present invention.

As shown in FIG. 15, the on-die termination circuit of the present embodiment differs from that of the first embodiment in that transistors p1~p5 have been changed to CMOS transistors with which PMOS transistors and NMOS transistors are associated.

The present embodiment is again assumed to be of a binary configuration, but the relation between the widths w of transistors p1~p5 is the same as in the first embodiment, and the relation between the widths of transistors n1~n5 is the same as in the second embodiment.

While preferred embodiments of the present invention have been described using specific terms, such description is for illustrative purposes only, and it is to be understood that changes and variations may be made without departing from the spirit or scope of the following claims.

What is claimed is:

1. A semiconductor apparatus including an on-die termination circuit, the on-die termination circuit comprising:

a main resistance circuit that is provided with one or more resistance elements and one or more transistors that are turned OFF when the on-die termination circuit is to be placed in the OFF state and turned ON when the on-die termination circuit is to be placed in the ON state; and an adjustment circuit that is provided with a plurality of transistors that are connected in parallel to each other and further connected in parallel to said main resistance circuit, said plurality of transistors being turned ON or OFF when said on-die termination circuit is placed in the ON state so as to adjust the termination resistance of the entirety of the on-die termination circuit, wherein the adjustment circuit does not contain resistance elements.

2. The semiconductor apparatus according to claim 1, wherein the resistance of transistors that make up said adjustment circuit is at least 2.5 times the target value of the termination resistance.

3. The semiconductor apparatus according to claim 1, wherein transistors that make up said main resistance circuit and said adjustment circuit are NMOS transistors, PMOS transistors, or CMOS transistors with which NMOS transistors and PMOS transistors are associated.

4. The semiconductor apparatus according to claim 1, wherein transistors of the main resistance circuit and the adjustment circuit are controlled in response to a control signal.

5. The semiconductor apparatus according to claim 1, wherein a termination voltage is a power supply voltage and wherein the termination voltage is connected to source terminals of the one or more transistors of the main resistance circuit and source terminals of the plurality of transistors of the adjustment circuit.

6. The semiconductor apparatus according to claim 1, wherein a termination voltage is a ground voltage and wherein the termination voltage is connected to source terminals of the one or more transistors of the main resistance circuit and source terminals of the plurality of transistors of the adjustment circuit.

7. A semiconductor apparatus including an on-die termination circuit, the on-die termination circuit comprising:

a main resistance circuit that is provided with one or more resistance elements and one or more transistors that are turned OFF when the on-die termination circuit is to be placed in the OFF state and turned ON when the on-die termination circuit is to be placed in the ON state; and an adjustment circuit that is provided with one or more transistors that are both connected together in parallel and connected in parallel to said main resistance circuit, said transistors being turned ON or OFF when said on-die termination circuit is placed in the ON state so as to adjust the termination resistance of the entirety of the on-die termination circuit;

wherein the adjustment circuit does not contain resistance elements;

wherein a termination voltage, which is a power supply voltage, is connected to source terminals of a first portion of the one or more transistors of the main resistance circuit and source terminals of a first portion of the one or more transistors of the adjustment circuit;

wherein a termination voltage, which is ground, is connected to source terminals of a second portion of the one or more transistors of the main resistance circuit and source terminals of a second portion of the one or more transistors of the adjustment circuit; and wherein the first portion of the one or more transistors of the main resistance circuit and the first portion of the one or more transistors of the adjustment circuit share a terminal pin with the second portion of the one or more transistors of the main resistance circuit and the second portion of the one or more transistors of the adjustment circuit such that the termination voltage is set to one half the power supply voltage.

8. A semiconductor apparatus including an on-die termination circuit, the on-die termination circuit comprising:
a main resistance circuit that is provided with one or more resistance elements and one or more transistors that are controlled in response to a control signal; and
an adjustment circuit that is provided with a plurality of electrical paths that are connected in parallel to each other and further connected in parallel to the main resistance circuit, each of the electrical paths comprising a transistor, the transistor in each of the electrical paths except for at least one thereof being turned ON and the transistor in each of remaining one or ones of the electrical paths being turn OFF,
wherein the adjustment circuit does not contain resistance elements.

9. The semiconductor apparatus according to claim 8, wherein the resistance of transistors that make up said adjustment circuit is at least 2.5 times the target value of the termination resistance.

10. The semiconductor apparatus according to claim 8, wherein transistors that make up said main resistance circuit and said adjustment circuit are NMOS transistors, PMOS transistors, or CMOS transistors with which NMOS transistors and PMOS transistors are associated.

11. The semiconductor apparatus according to claim 8, wherein a termination voltage is a power supply voltage and wherein the termination voltage is connected to source terminals of the one or more transistors of the main resistance circuit and a source terminal of the transistor of each of the electrical paths of the adjustment circuit.

12. The semiconductor apparatus according to claim 8, wherein a termination voltage is a ground voltage and wherein the termination voltage is connected to source terminals of the one or more transistors of the main resistance circuit and a source terminal of the transistor of each of the electrical paths of the adjustment circuit.

13. A semiconductor apparatus including an on-die termination circuit, the on-die termination circuit comprising:
a main resistance circuit that is provided with one or more resistance elements and one or more transistors that are controlled in response to a control signal; and
an adjustment circuit that is provided with one or more transistors that are both connected together in parallel and connected in parallel to said main resistance circuit, said transistors being controlled in response to said control signal;
wherein the adjustment circuit does not contain resistance elements;
wherein a termination voltage which is a power supply voltage, is connected to source terminals of a first portion of the one or more transistors of the main resistance circuit and source terminals of a first portion of the one or more transistors of the adjustment circuit;
wherein a termination voltage which is ground, is connected to source terminals of a second portion of the one or more transistors of the main resistance circuit and source terminals of a second portion of the one or more transistors of the adjustment circuit; and
wherein the first portion of the one or more transistors of the main resistance circuit and the first portion of the one or more transistors of the adjustment circuit share a terminal pin with the second portion of the one or more transistors of the main resistance circuit and the second portion of the one or more transistors of the adjustment circuit such that the termination voltage is set to one half the power supply voltage.

14. The semiconductor apparatus according to claim 7, wherein the resistance of transistors that make up said adjustment circuit is at least 2.5 times the target value of the termination resistance.

15. The semiconductor apparatus according to claim 7, wherein transistors that make up said main resistance circuit and said adjustment circuit are NMOS transistors, PMOS transistors, or CMOS transistors with which NMOS transistors and PMOS transistors are associated.

16. The semiconductor apparatus according to claim 13, wherein the resistance of transistors that make up said adjustment circuit is at least 2.5 times the target value of the termination resistance.

17. The semiconductor apparatus according to claim 13, wherein transistors that make up said main resistance circuit and said adjustment circuit are NMOS transistors, PMOS transistors, or CMOS transistors with which NMOS transistors and PMOS transistors are associated.

* * * * *